(12) United States Patent
Buschmann

(10) Patent No.: US 10,941,063 B2
(45) Date of Patent: Mar. 9, 2021

(54) METHOD FOR DOWN-HOLE TREATMENT OF A PRODUCTION WELL FOR SULFUR BASED CONTAMINANTS

(71) Applicant: Clean Chemistry, Inc., Boulder, CO (US)

(72) Inventor: Wayne E. Buschmann, Boulder, CO (US)

(73) Assignee: Clean Chemistry, Inc., Boulder, CO (US)

(*) Notice: Subject to any disclaimer, the term of this patent is extended or adjusted under 35 U.S.C. 154(b) by 0 days.

(21) Appl. No.: 16/667,549

(22) Filed: Oct. 29, 2019

(65) Prior Publication Data
US 2020/0062623 A1 Feb. 27, 2020

Related U.S. Application Data

(63) Continuation of application No. 15/081,411, filed on Mar. 25, 2016, now Pat. No. 10,472,265.
(Continued)

(51) Int. Cl.
*C02F 1/72* (2006.01)
*C02F 1/52* (2006.01)
(Continued)

(52) U.S. Cl.
CPC ............ *C02F 1/722* (2013.01); *C02F 1/5245* (2013.01); *C02F 1/56* (2013.01); *C02F 1/66* (2013.01);
(Continued)

(58) Field of Classification Search
CPC ..................................................... C02F 1/722
See application file for complete search history.

(56) References Cited

U.S. PATENT DOCUMENTS

| 3,719,552 A | 3/1973 | Farley |
| 3,925,234 A | 12/1975 | Hachmann et al. |

(Continued)

FOREIGN PATENT DOCUMENTS

| CN | 1142555 | 2/1997 |
| CN | 102007230 | 4/2011 |

(Continued)

OTHER PUBLICATIONS

Suihko et al.; "A study of the microflora of some recyled fibre pulps, boards and kitchen rolls"; The Journal of Applied Microbiology; 1997; vol. 83; pp. 199-207.

(Continued)

*Primary Examiner* — Peter Keyworth
(74) *Attorney, Agent, or Firm* — Snell & Wilmer LLP.

(57) ABSTRACT

In some embodiments, a method may include treating water comprising sulfur based contaminants. The method may include contacting a portion of water comprising a quantity of hydrogen sulfide with a first oxidant. The method may include producing sulfur solids as a result of contacting the hydrogen sulfide in the portion of water with the first oxidant. In some embodiments, the method may include separating the sulfur solids from the water. The first oxidant may include hydrogen peroxide. In some embodiments, oxidation of contaminated fluids may be accelerated by adding an acid in combination with a second oxidant to the contaminated fluids. In some embodiments, oxidation of contaminated fluids may be accelerated by adjusting a pH of the contaminated fluids after addition of an oxidant to the contaminated fluids. In some embodiments, the pH may be adjusted to less than 7.

18 Claims, 4 Drawing Sheets

Related U.S. Application Data

(60) Provisional application No. 62/138,627, filed on Mar. 26, 2015, provisional application No. 62/147,558, filed on Apr. 14, 2015, provisional application No. 62/155,741, filed on May 1, 2015.

(51) Int. Cl.
 C02F 101/10 (2006.01)
 C02F 1/56 (2006.01)
 C02F 1/66 (2006.01)

(52) U.S. Cl.
 CPC .. C02F 2101/101 (2013.01); C02F 2209/005 (2013.01); C02F 2209/02 (2013.01); C02F 2209/04 (2013.01); C02F 2209/06 (2013.01); C02F 2209/11 (2013.01); C02F 2209/40 (2013.01); C02F 2303/04 (2013.01)

(56) References Cited

U.S. PATENT DOCUMENTS

| | | | |
|---|---|---|---|
| 4,055,505 A | 10/1977 | Gray |
| 4,076,621 A | 2/1978 | Hardison |
| 4,348,256 A | 9/1982 | Bergstrom, Jr. et al. |
| 4,393,037 A | 7/1983 | Delaney |
| 4,576,609 A | 3/1986 | Hageman |
| 4,673,473 A | 6/1987 | Ang |
| 4,722,773 A | 2/1988 | Plowman et al. |
| 4,952,276 A | 8/1990 | Gidlund |
| 4,966,706 A | 10/1990 | Gregor |
| 5,053,142 A | 10/1991 | Sorensen et al. |
| 5,246,543 A | 9/1993 | Meier et al. |
| 5,387,317 A | 2/1995 | Parthasarathy et al. |
| 5,424,032 A | 6/1995 | Christensen et al. |
| 5,431,781 A | 7/1995 | Walsh |
| 5,472,619 A | 12/1995 | Holzhauer et al. |
| 5,494,588 A | 2/1996 | LaZonby |
| 5,565,073 A | 10/1996 | Fraser et al. |
| 5,683,724 A | 11/1997 | Hei et al. |
| 5,770,035 A | 6/1998 | Faita |
| 5,785,812 A | 7/1998 | Linsten et al. |
| 5,817,240 A | 10/1998 | Miller et al. |
| 6,007,678 A | 12/1999 | Linsten et al. |
| 6,015,536 A | 1/2000 | Lokkesmoe et al. |
| 6,126,782 A | 10/2000 | Liden et al. |
| 6,183,623 B1 | 2/2001 | Cisar et al. |
| 6,258,207 B1 | 7/2001 | Pan |
| 6,387,238 B1 | 5/2002 | Merk et al. |
| 6,569,286 B1 | 5/2003 | Withenshaw et al. |
| 6,712,949 B2 | 3/2004 | Gopal |
| 8,318,972 B2 | 11/2012 | Buschmann et al. |
| 9,517,955 B2 | 12/2016 | Buschmann |
| 9,517,956 B2 | 12/2016 | Buschmann |
| 9,551,076 B2 | 1/2017 | Buschmann |
| 10,259,729 B2 | 4/2019 | Buschmann |
| 10,472,265 B2 | 11/2019 | Buschmann |
| 10,501,346 B2 | 12/2019 | Buschmann |
| 2001/0050234 A1 | 12/2001 | Shiepe |
| 2002/0153262 A1 | 10/2002 | Uno et al. |
| 2003/0019757 A1 | 1/2003 | Vetrovec |
| 2003/0019758 A1 | 1/2003 | Gopal |
| 2003/0024054 A1 | 2/2003 | Burns |
| 2004/0112555 A1 | 6/2004 | Tolan et al. |
| 2004/0134857 A1 | 7/2004 | Huling et al. |
| 2004/0200588 A1 | 10/2004 | Walker |
| 2005/0183949 A1 | 8/2005 | Daly |
| 2006/0207734 A1 | 9/2006 | Day |
| 2007/0074975 A1 | 4/2007 | Buschmann et al. |
| 2007/0212594 A1 | 9/2007 | Takasu et al. |
| 2007/0243449 A1 | 10/2007 | Sotomura et al. |
| 2009/0012346 A1 | 1/2009 | Al Nashef et al. |
| 2009/0090478 A1 | 4/2009 | Hollomon et al. |
| 2009/0152123 A1 | 6/2009 | Butler et al. |
| 2009/0285738 A1 | 11/2009 | Winter et al. |
| 2009/0314652 A1 | 12/2009 | Buschmann |
| 2010/0078331 A1 | 4/2010 | Scherson et al. |
| 2010/0160449 A1 | 6/2010 | Rovison, Jr. et al. |
| 2010/0176066 A1 | 7/2010 | Budde et al. |
| 2010/0179368 A1 | 7/2010 | Conrad |
| 2011/0017066 A1 | 1/2011 | Takeuchi et al. |
| 2011/0024361 A1 | 2/2011 | Schwartzel |
| 2011/0123642 A1 | 5/2011 | Wilmotte |
| 2011/0232853 A1 | 9/2011 | Yin |
| 2012/0067532 A1 | 3/2012 | Lee |
| 2012/0091069 A1 | 4/2012 | Fischmann |
| 2012/0108878 A1 | 5/2012 | Conrad |
| 2012/0145643 A1 | 6/2012 | Pandya |
| 2012/0240647 A1 | 9/2012 | Montemurro |
| 2012/0267315 A1 | 10/2012 | Soane et al. |
| 2012/0322873 A1 | 12/2012 | Atkins et al. |
| 2013/0259743 A1 | 10/2013 | Keasler et al. |
| 2013/0264293 A1 | 10/2013 | Keasler et al. |
| 2014/0069821 A1 | 3/2014 | Marcin et al. |
| 2014/0072653 A1 | 3/2014 | Buschmann |
| 2014/0131217 A1 | 5/2014 | Buschmann |
| 2014/0131259 A1 | 5/2014 | Goldblatt |
| 2014/0197102 A1 | 7/2014 | Van Der Wal et al. |
| 2014/0205777 A1 | 7/2014 | Hawkins et al. |
| 2014/0238626 A1 | 8/2014 | Tsuji et al. |
| 2014/0374104 A1 | 12/2014 | Seth |
| 2016/0068417 A1 | 3/2016 | Buschmann |
| 2016/0318778 A1 | 11/2016 | Buschmann |
| 2017/0051417 A1 | 2/2017 | Buschmann |
| 2017/0107128 A1 | 4/2017 | Buschmann |
| 2017/0114468 A1 | 4/2017 | Buschmann |
| 2017/0158537 A1 | 6/2017 | Buschmann |
| 2017/0159237 A1 | 6/2017 | Buschmann |
| 2019/0031545 A1 | 1/2019 | Buschmann et al. |
| 2019/0218121 A1 | 7/2019 | Buschmann |

FOREIGN PATENT DOCUMENTS

| | | |
|---|---|---|
| EP | 480469 A3 | 4/1992 |
| WO | 9402423 A1 | 2/1994 |
| WO | 9739179 A1 | 10/1997 |
| WO | 1999032710 | 7/1999 |
| WO | 2000069778 | 11/2000 |
| WO | 2008056025 A2 | 5/2008 |
| WO | 2010059459 | 5/2010 |
| WO | 2012166997 | 12/2012 |
| WO | 2013060700 A1 | 5/2013 |
| WO | 2013064484 | 5/2013 |
| WO | 2014039929 | 3/2014 |
| WO | 2014100828 | 6/2014 |
| WO | 2016037149 | 3/2016 |
| WO | 2016154531 | 9/2016 |
| WO | 2017100284 | 6/2017 |
| WO | 2017100299 | 6/2017 |

OTHER PUBLICATIONS

Shackford; "A Comparison of Pulping and Bleaching of Kraft Softwood and Eucalyptus Pulps"; 36th Intl. Pulp and Paper Congress and Exhibition; Oct. 13-16, 2003; Sao Paulo, Brazil; 17 pgs.
Suslow; "Oxidation-Reduction Potential (ORP) for Water Disinfection Monitoring, Control, and Documentation"; Univ. California; Division of Agriculture and Natural Resources; ANR Publication 8149; 5 pgs.; http://anrcatalog.ucdavis.edu; 2004; 5 pgs.
Pedros et al.; "Chlorophyll fluorescence emission spectrum inside a leaf"; The Royal Society of Chemistry and Owner Societies; 2008; No. 7; pp. 498-502.
Coyle et al.; "Peracetic Acid as an Alternative Disinfection Technology for Wet Weather Flows"; Water Environment Research; Aug. 2014; pp. 687-697.
Smook; Chapter 14: Secondary Fiber;Handbook for Pulp & Papers Technologists; Angus Wilde Publications; 2001; pp. 209-219.
Gullichsen et al., eds.; Chemical Pulping; Papermaking Science and Technology; Book 6A; 1999; Fapet Oy; pp. A40-A41 and A616-A665.
Hill et al.; "Part 1: Peracetic Acid—An effective alternative for Chlorine compound Free Delignification of Kraft Pulp"; 1992; Pulping Conference; pp. 1219-1230.

(56) References Cited

OTHER PUBLICATIONS

Verween et al.; "Comparative toxicity of chlorine and peracetic acid in the biofouling control of Mytilopsis leucophaeata and Dreissena polymorpha embryos (Mollusca, Bivalvia)"; International Biodeterioration & Biodegradation; vol. 63, No. 4; 2009; pp. 523-528.

METHOD FOR DOWN-HOLE TREATMENT OF A PRODUCTION WELL FOR SULFUR BASED CONTAMINANTS

RELATED APPLICATIONS

This application is a continuation of U.S. patent application Ser. No. 15/081,411 entitled "SYSTEMS AND METHODS OF REDUCING A BACTERIA POPULATION IN HIGH HYDROGEN SULFIDE WATER" filed on Mar. 25, 2016, which claims the priority to U.S. Provisional Patent Application No. 62/138,627 entitled "SYSTEMS AND METHODS OF MITIGATION AND/OR REDMEDIATION OF HYDROGEN SULFIDE" filed on Mar. 26, 2015, U.S. Provisional Patent Application No. 62/147,558 entitled "SYSTEMS AND METHODS OF REDUCING A BACTERIA POPULATION IN HIGH HYDROGEN SULFIDE WATER" filed on Apr. 14, 2015, and U.S. Provisional Patent Application No. 62/155,741 entitled "SYSTEMS AND METHODS OF REDUCING A BACTERIA POPULATION IN HIGH HYDROGEN SULFIDE WATER" filed on May 1, 2015, all of which are incorporated by reference herein.

BACKGROUND OF THE INVENTION

1. Field of the Invention

The present disclosure generally relates to mitigation and/or remediation of hydrogen sulfide. More particularly, the disclosure generally relates to mitigation and/or remediation of hydrogen sulfide using Reactive Oxygen Species (ROS).

2. Description of the Relevant Art

The present disclosure relates to hydrogen sulfide mitigation. Hydrogen sulfide mitigation is important in the oilfield, municipal water, and other industries. Hydrogen sulfide may be produced by bacteria, released by iron sulfide deposits, released from naturally occurring geologic deposits, or accumulates in the headspace of tanks and containment vessels. Hydrogen sulfide gas is a toxic and potentially fatal exposure hazard to workers and populations that may be directly impacted by fugitive emissions and accidental releases. Hydrogen sulfide is highly corrosive and leads to premature damage and failure of equipment. Corrosion caused by hydrogen sulfide and biological deposits increases production well operating costs significantly when casings, tubulars, pumps and other down-hole equipment is damaged and needs replacing. Hydrogen sulfide may have negative economic impacts on the value of crude oil and natural gas, which is based on the exposure levels produced in transit and total sulfur that a refinery or natural gas processing facility must contend with.

Hydrogen sulfide mitigation may be accomplished in a formation where bacteria contamination, biofilm growth, and iron sulfide deposits have accumulated. Hydrogen sulfide mitigation may be accomplished at the surface, for example, at a well head, heater treater, gunbarrel, crude oil depot, transfer station, water storage tank, water impoundment (e.g., lined pit), disposal well, salt water disposal well, and in a water treatment process. Preventative measures to avoid well and formation contamination with bacteria and hydrogen sulfide souring may be accomplished by treating water before it is used for drilling fluids, hydraulic fracturing and water flood injections.

Control of microbial growth and hydrogen sulfide levels in wells is important to maintaining the integrity and productivity of a well, reducing corrosion and maintenance cycles, protecting the quality of products produced from a well (e.g., oil, gas, water) and protecting people from exposure to toxic levels of hydrogen sulfide contained in the products and in the head space of tanks, pipes, separators and other containment vessels.

It is desirable to effectively mitigate and/or remediate hydrogen sulfide, biological growth, iron sulfide buildup and emulsions while having minimal impacts on pH and scaling potential of fluids.

SUMMARY OF THE INVENTION

In some embodiments, a method may include treating water comprising sulfur based contaminants. The method may include contacting a portion of water comprising a quantity of hydrogen sulfide with a first oxidant. The method may include producing sulfur solids as a result of contacting the hydrogen sulfide in the portion of water with the first oxidant. In some embodiments, the method may include separating the sulfur solids from the water.

In some embodiments, a method may include controlling introduction of the first oxidant based upon feedback from a sensor. The sensor may include a flow meter and/or an ORP sensor.

In some embodiments, the quantity of hydrogen sulfide comprises greater than about 20 ppm hydrogen sulfide. In some embodiments, the quantity of hydrogen sulfide comprises greater than about 20 ppm hydrogen sulfide and up to about 1,000 ppm hydrogen sulfide.

In some embodiments, the method may include contacting the portion of water comprising the quantity of hydrogen sulfide with the first oxidant until hydrogen sulfide has been substantially removed. Substantial removal of hydrogen sulfide may include removal such that at least about 50 to about 100% or about 80 to about 99% hydrogen sulfide is removed.

In some embodiments, the first oxidant may include hydrogen peroxide. The hydrogen peroxide may include a concentration range of between about 10% and about 50%, between about 20% and about 40%, or between about 30% and 35%.

In some embodiments, the method may include inhibiting formation of oxoacids and oxoacid salts of sulfur during production of the sulfur solids. The method may include inhibiting formation of oxoacids and oxoacid salts of sulfur during production of the sulfur solids by controlling introduction of an amount of the first oxidant.

In some embodiments, the method may include inhibiting formation of sulfate during production of the sulfur solids. The method may include inhibiting formation of sulfate during production of the sulfur solids by controlling introduction of an amount of the first oxidant.

In some embodiments, the separated sulfur solids result from sulfur solids coagulated and flocculated into larger particles.

In some embodiments, the method may include contacting the portion of water comprising the quantity of hydrogen sulfide with a second oxidant. The second oxidant may react faster than the first oxidant with the hydrogen sulfide. The second oxidant may react at least about 10 to about 50 or about 20 to about 40 times faster than the first oxidant. The second oxidant may react at least about 15 or about 30 times faster than the first oxidant.

In some embodiments, the second oxidant may include a peracetate solution. The peracetate solution may include peracetate anions and a peracid. The peracetate solution may have a pH from about pH 10 to about pH 12. The peracetate solution may have a molar ratio of peracetate anions to peracid ranging from about 60:1 to about 6000:1.

In some embodiments, the method may include contacting the portion of water comprising the quantity of hydrogen sulfide with a second oxidant, wherein the second oxidant react with the hydrogen sulfide and sulfur-containing contaminants and microbes.

In some embodiments, the method may include contacting the portion of water comprising the quantity of hydrogen sulfide with a second oxidant and a coagulant. The coagulant may improve selectivity, reduce oxidant demand from sulfur solids and/or inhibit sulfate production. The coagulant may increase particle size of the sulfur solids and reduces their surface area and rate of reaction with the second portion of oxidant. In some embodiments, the method may include controlling introduction of the coagulant based upon feedback from a sensor. The sensor may include a turbidity sensor.

In some embodiments, a method may include treating a bacteria population in water comprising sulfur based contaminants. The method may include contacting a portion of water comprising a bacteria population and a quantity of hydrogen sulfide with an oxidant and a coagulant. The method may include producing coagulated solids as a result of contacting the hydrogen sulfide and the bacteria population in the portion of water with the oxidant. The method may include separating the coagulated solids from the water.

In some embodiments, the quantity of hydrogen sulfide may include greater than about 0.1 ppm hydrogen sulfide and up to about 50 ppm hydrogen sulfide. The quantity of hydrogen sulfide may include greater than about 0.1 ppm hydrogen sulfide and up to about 1000 ppm hydrogen sulfide.

In some embodiments, the oxidant may include a peracetate solution. The peracetate solution may include peracetate anions and a peracid. The peracetate solution may have a pH from about pH 10 to about pH 12. The peracetate solution may have a molar ratio of peracetate anions to peracid ranging from about 60:1 to about 6000:1.

In some embodiments, a system and/or method includes treating a bacteria population in water comprising high sulfur based contaminants. The method may include contacting a portion of water comprising a bacteria population and a high quantity of hydrogen sulfide with a first portion of oxidant. The method may include reducing the bacteria population by oxidizing at least a portion of the bacteria population using the first portion of oxidant resulting in a first treated water. The method may include contacting the first treated water with a second portion of oxidant. The method may include reducing the bacteria population of the first treated water by oxidizing at least a portion of the bacteria population using the second portion of oxidant resulting in a second treated water. The method may include assessing a progress of the oxidation. The method may include adjusting an amount of oxidant in response to the assessed progress.

In some embodiments, a system and/or method includes treating water comprising high sulfur based contaminants. The method may include contacting a portion of water including a high quantity of hydrogen sulfide with a first portion of oxidant and oxidizing a first portion of the hydrogen sulfide to sulfur solids. The method may include separating a first portion of sulfur solids and a first portion of bacteria from the portion of water resulting in a first treated water. The first portion of sulfur solids may include products resulting from the reaction of the first portion of the hydrogen sulfide with the first portion of oxidant. In some embodiments, the method may include contacting the first treated water with a second portion of oxidant and oxidizing a second portion of the hydrogen sulfide to sulfur solids. The method may include separating a second portion of sulfur solids and a second portion of bacteria from the portion of water resulting in a second treated water. The second portion of sulfur solids may include products resulting from the reaction of the second portion of the hydrogen sulfide with the second portion of oxidant. In some embodiments, the method may include assessing a progress of the oxidation of the hydrogen sulfide to sulfur solids.

In some embodiments, a system and/or method includes treating sulfur based contaminants associated with well fluids extracted from hydrocarbon and water producing wells. The method may include providing a peracetate solution. The peracetate solution may include peracetate anions and a peracid. In some embodiments, the peracetate solution has a pH from about pH 10 to about pH 12. In some embodiments, the peracetate solution has a molar ratio of peracetate anions to peracid ranging from about 60:1 to about 6000:1. In some embodiments, the peracetate solution has a molar ratio of peracetate to hydrogen peroxide of greater than about 16:1. The method may include contacting well fluids, portions of a production zone, and/or production equipment associated with the production zone with the peracetate solution. The well fluids may be extracted from hydrocarbon and/or water producing wells in the production zone. The method may include separating at least some sulfur based contaminants from the well fluids.

In some embodiments, oxidation of contaminated fluids may be accelerated by adding an acid in combination with an oxidant to the contaminated fluids. In some embodiments, oxidation of contaminated fluids may be accelerated by adjusting a pH of the contaminated fluids after addition of an oxidant to the contaminated fluids. The pH may be adjusted to less than 7 The acid may include inorganic acids or mineral acids (e.g., sulfuric acid, bisulfate, hydrochloric acid, phosphoric acid, nitric acid, carbonic acid) and organic acids (e.g., acetic acid, citric acid, propionic acid, tartaric acid, ascorbic acid).

BRIEF DESCRIPTION OF THE DRAWINGS

Advantages of the present invention may become apparent to those skilled in the art with the benefit of the following detailed description of the preferred embodiments and upon reference to the accompanying drawings.

Figure 1:
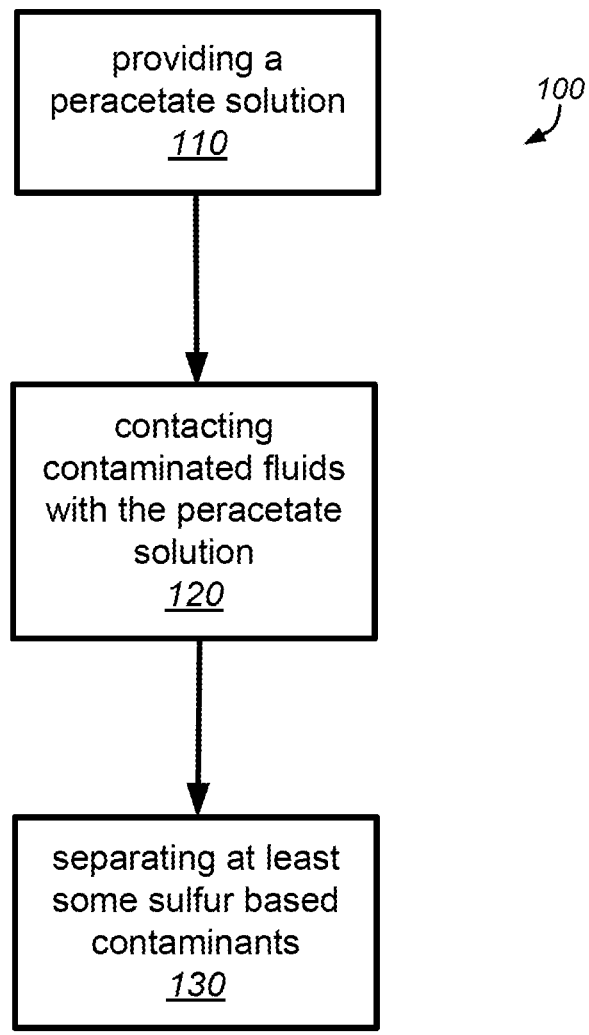
FIG. 1 depicts a graphical representation of a flow chart of a method to mitigate and/or remediate sulfur based contaminants affecting fluids extracted from hydrocarbon and water producing wells.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task. In some contexts, "configured to" may be a broad recitation of structure generally meaning "having a feature that" performs the task or tasks during operation. As such, the component can be configured to perform the task even when the component is not currently on.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112 paragraph (f), interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

It is to be understood the present invention is not limited to particular devices or biological systems, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Thus, for example, reference to "a linker" includes one or more linkers.

DETAILED DESCRIPTION

Definitions

Unless defined otherwise, all technical and scientific terms used herein have the same meaning as commonly understood by one of ordinary skill in the art.

The term "about" (or in some cases "substantially" depending upon context of use) as used herein generally refers to within +/−10% of a stated value (unless stated otherwise). For example, "about 10" may refer to a range of 9-11 (unless stated otherwise).

The term "connected" as used herein generally refers to pieces which may be joined or linked together.

The term "coupled" as used herein generally refers to pieces which may be used operatively with each other, or joined or linked together, with or without one or more intervening members.

The term "directly" as used herein generally refers to one structure in physical contact with another structure, or, when used in reference to a procedure, means that one process effects another process or structure without the involvement of an intermediate step or component.

The term "sulfur-based contaminants" as used herein generally refers undesirable molecules or compounds which include the element sulfur (e.g., inorganic sulfides, sulfur, $H_2S$, $HS^-$, $S_2^-$, mercaptans, thiols, thiophenes, organic sulfides, elemental sulfur, sulfites, sulfur dioxide, thionates, etc.).

The term "treating" as used herein generally refers making a compound less innocuous and/or more commercially acceptable through molecular reaction (e.g., oxidation, etc.), separation (e.g., through precipitation, demulsification, etc.), etc.

Embodiments

Accordingly, there exists a need for compositions and/or methods which effectively mitigate and/or remediate hydrogen sulfide, biological growth, iron sulfide buildup and emulsions while having minimal impacts on pH and scaling potential of fluids.

Efficient and continuous removal of bacteria and sulfide from high $H_2S$ water, especially when such water contains very low suspended solids and iron, may be achieved by a chemical-physical process, which in some embodiments incorporates oxidation, coagulation, flocculation and clarification. High $H_2S$ water may generally refer to water containing greater than about 50 mg/L sulfide and up to, and greater than, 500 mg/L sulfide. In some embodiments, sulfide refers to a combination of $H_2S$, $HS^-$ and $S^{2-}$ species in equilibrium concentrations proportionate to the solution pH relative to hydrogen sulfide's pKa of 7.0.

In some embodiments, oxidation includes the use of an oxidant or a combination of oxidants including sodium peracetate, hydrogen peroxide, chlorine dioxide, sodium hypochlorite, peracetic acid and ozone. In some embodiments, the oxidant includes a hydrogen peroxide solution. In some embodiments, the hydrogen peroxide includes a concentration range of between about 10% and about 50%, between about 20% and about 40%, or between about 30% and 35%. In some embodiments, the hydrogen peroxide includes a concentration range of between about 30% and 35%. In some embodiments, coagulation includes the use of a coagulant (e.g., aluminum chloride, polyaluminum chloride, aluminum chlorohydrate, aluminum sulfate, ferric chloride, iron sulfide, and suspended solids contained in the water to be treated). In some embodiments, flocculation involves the agglomeration of coagulated particles into larger, more massive and stable particles that allow for more rapid separation from the water phase. Flocculation may be promoted by the use of a flocculation polymer (e.g., anionic polymers and cationic polymers) which are readily dispersed in water and bind to suspended materials. In some embodiments, clarification includes methods of settling, flotation, centrifugation and filtration used separately or in combination.

A variety of cost, safety and performance factors may be considered when choosing oxidants for the removal of bacteria and sulfide from high $H_2S$ water. The use of chlorine dioxide may rapidly acidify water and chlorine dioxide gas must be injected into the water being treated due to the practical concentration of $ClO_2$ being near 0.3% in water. The volume of 0.3% chlorine dioxide solution required for treatment of high $H_2S$ water may be prohibitive while the production and injection of large quantities of chlorine dioxide gas into a high $H_2S$ stream may be particularly hazardous. Chlorine dioxide and hypochlorite do not enhance flocculation as well as oxygen-based oxidants. Ozone gas has an even more limited solubility in water than $ClO_2$ and will rapidly oxidize sulfur to sulfate, which is an undesirable byproduct in water intended for reuse in the oil field. Peracetic acid reacts rapidly with hydrogen sulfide and may be obtained in 15 to 30% wt/wt solutions. However, these peracetic acid solutions also contain high concentrations of hydrogen peroxide and acetic acid making them particularly hazardous for handling and exposure. Hydrogen peroxide reacts more slowly than other oxidants with ionized forms of hydrogen sulfide and organo-sulfide compounds, but does not significantly acidify the treated water and may be injected into high $H_2S$ water as a liquid concentrate (e.g., 15 to 35% wt/wt hydrogen peroxide solution in water). Hydrogen peroxide does not add organic carbon, chlorate, chlorine or chlorinated byproducts to the water being treated, but it may emulsify oils. Sodium peracetate solutions react very rapidly with sulfides and may be provided at modest concentrations (e.g., 5%) as a solution, have low volatility and are produced as needed from stable, non-flammable feedstocks. Sodium peracetate solutions have previously been found to promote oil-water separation and rapid flocculation and clarification.

Each of the above oxidants, with the exception of hydrogen peroxide, are known to be effective at reducing bacteria populations such as sulfate reducing bacteria. However, hydrogen sulfide reacts with and consumes oxidants faster than the oxidants may significantly act on bacteria. The rapid oxidant consumption by hydrogen sulfide typically requires an excess of oxidant (i.e., greater than the oxidant demand of the sulfides and other impurities present) be used to reduce bacteria populations, which significantly drives up the chemical cost of treatment.

In some embodiments, chemical-physical methods are used for treating high $H_2S$ water by oxidizing hydrogen sulfide and other sulfide species while removing bacteria without using excessive amounts of oxidants. In some embodiments, the method may involve adding a first quantity of oxidant to oxidize a portion of the hydrogen sulfide to sulfur solids. The method may include removing the sulfur solids with a first portion of bacteria from the water in a first clarification step. In some embodiments, a second quantity of oxidant is added to oxidize the remainder of the hydrogen sulfide to sulfur solids. The method may include removing the sulfur solids with a second portion of bacteria from the water in a second clarification step. The finished water is clear, free of $H_2S$ and has a significantly reduced bacteria population. The progress of each oxidation step may be monitored by measuring the oxidative-reductive potential (ORP) of the water being treated. The amount of oxidant added to the water being treated may be adjusted and controlled in response to the ORP measurement.

In some embodiments, a bacteria population may be reduced without having to remove all of the hydrogen sulfide and other sulfur contaminants. This method may be conducted with hydrogen peroxide or with peracetate solution. Certain industries desire bacteria control without needing to remove all of the sulfides. Creating some sulfur solids with oxidant and coagulant may enable the removal of at least a portion of the bacteria (because bacteria tend to stick to particle surfaces). The bacteria do not necessarily have to be killed directly by an oxidant for their removal.

In some embodiments, oxidation of contaminated fluids may be accelerated by adding an acid in combination with an oxidant to the contaminated fluids. In some embodiments, oxidation of contaminated fluids may be accelerated by adjusting a pH of the contaminated fluids after addition of an oxidant to the contaminated fluids. The pH may be adjusted to less than 7 The acid may include inorganic acids or mineral acids (e.g., sulfuric acid, bisulfate, hydrochloric acid, phosphoric acid, nitric acid, carbonic acid) and organic acids (e.g., acetic acid, citric acid, propionic acid, tartaric acid, ascorbic acid).

In some embodiments, oxidation chemistry may be used to mitigate hydrogen sulfide, biological growth, iron sulfide buildup and emulsions. The oxidation chemistry used may have minimal impacts on pH and scaling potential of fluids. A relatively short-lived active oxidant may be a benefit for avoiding negative impacts on hydrocarbon quality and for minimizing oxidant corrosivity and environmental impacts. Selectivity of the oxidation chemistry towards different materials is also desirable for efficiency of oxidant use, compatibility with a variety of materials and avoidance of unnecessary or undesirable side reactions. Oxidant solutions that generate a variety of reactive oxygen species (ROS) in their treatment environments may be good candidates for achieving some or all of these attributes.

Reactive oxygen species are, in general, short lived and not stable enough to put in a container for storage and shipping. They are best generated by in-situ activation methods. ROS may include singlet oxygen ($^1O_2$), superoxide radical ($O2.^-$), hydroperoxyl radical (HOO.), hydroxyl radical (HO.), acyloxy radical (RC(O)—O.), and other activated or modified forms of ozone (e.g., ozonides and hydrogen trioxide). Each of these ROS has its own oxidation potential, reactivity/compatibility profile, compatibility/selectivity and half-lives.

ROS may be generated in-situ by several chemical methods including the Fenton catalytic cycle with hydrogen peroxide and iron catalysts (produces hydroxyl and superoxide radicals), combining ozone with hydrogen peroxide (produces ozonides, radicals), and combining hypochlorite with hydrogen peroxide (singlet oxygen). Other methods of generating ROS may include photochemical approaches, which are generally very dilute in ROS and are not practical systems for down-hole well treatments or treatment of optically non-transmissive, highly scaling fluids or fluids with high turbidity including crude oil, flowback water, saline production water, black water, and emulsions. In some embodiments, emulsions may include oil in water emulsions, water in oil emulsions, and emulsions comprised of a combination of oil, water and solids.

Some ROS (e.g., hydroxyl radical and ozonides) are too short lived and too reactive to be practical in highly contaminated or hydrocarbon environments. Salt and carbonate may rapidly quench the hydroxyl radical. Ozone and stronger oxidants, like hydroxyl radical, oxidize salts to form toxic chlorate and bromate byproducts. Chlorine-containing oxidant formulations are typically more corrosive than peroxides, are less efficient for $H_2S$ oxidation and rapidly chlorinate unsaturated hydrocarbons. Significant quantities of hydrogen peroxide used in ROS generation methods may promote emulsification of oils. The hydrogen peroxide itself may be a ROS oxidant consumer by being oxidized by or reacting with a variety of ROS chemistries.

In some embodiments, one preferred ROS-producing oxidant formulation is a peracetate solution (e.g., described in PCT Publication No. WO/2014/039929A1 to Buschmann and U.S. Provisional Patent Application Ser. No. 62/046,097 to Buschmann both of which are incorporated by reference as if fully set forth herein). In some embodiments, the peracetate solution may include peracetate anions and a peracid. In some embodiments, the peracetate solution may include a pH from about pH 10 to about pH 12. In some embodiments, the peracetate solution has a molar ratio of peracetate anions to peracid ranging from about 60:1 to about 6000:1. ROS-generating sodium peracetate solutions may contain no hydrogen peroxide, and are produced on site and on demand at alkaline pH. The sodium peracetate oxidant solution produces multiple ROS by itself and when placed into contaminated environments. In some embodiments, the ROS most important in sodium peracetate solutions include singlet oxygen, superoxide radical, hydroperoxyl radical, acetyloxy radical and potentially other radical fragments. When combinations of these ROSs are generated together in sodium peracetate solutions they produce an oxidative-reductive potential (ORP) response in water that may exceed 900 mV (vs standard hydrogen electrode) around pH 7. These solutions may be more convenient and effective to use than other approaches. The dominant ROS may be selectively reactive such that they are effective in a variety of environments.

In some embodiments, a method may include making a reactive species formulation. The method may include providing an alkaline hydrogen peroxide solution. The method may include contacting the alkaline hydrogen peroxide solution with an acyl donor. A peracid concentrate may be produced by the contacting of the alkaline hydrogen peroxide with the acyl donor. The peracid concentrate may have a molar ratio of hydrogen peroxide to acyl donor reactive groups ranging from about 1:1.25 to about 1:4. The method may include maintaining the peracid concentrate pH value in a range from about pH 10 to about pH 12.

In some embodiments, a peracid composition may include a mixture of an alkali concentrate, hydrogen peroxide, and an acyl donor. The peracid concentrate may have a pH value ranging from about pH 10 to about pH 12. The peracid concentrate may have a first molar ratio of peracid anion to peracid acid ranging from about 60:1 to 6000:1. The peracid concentrate may have a second molar ratio of peracetate to hydrogen peroxide of 16:1 or more.

FIG. 1 depicts a graphical representation of a flow chart of a method to separate sulfur based contaminants affecting fluids extracted from hydrocarbon and water producing wells. In some embodiments, a method includes providing a peracetate solution (110). The method may include contacting well fluids with the peracetate solution (120). The well fluids may be extracted from hydrocarbon and/or water producing wells. The method may include extracting at least some sulfur based contaminants from the well fluids (130). At least some of the contaminants comprise products resulting from the reaction of sulfur based contaminants with the peracetate solution.

In some embodiments, methods described herein mitigate hydrogen sulfide ($H_2S$) and related problems using ROS-generating sodium peracetate oxidant solutions. In some embodiments, methods described herein mitigate hydrogen sulfide ($H_2S$) and related problems affecting fluids extracted from hydrocarbon and water production wells using ROS-generating sodium peracetate oxidant solutions. In some embodiments, the $H_2S$ mitigation may be conducted at the surface by treating production fluids, crude oil, gas, and water directly.

Figure 2:
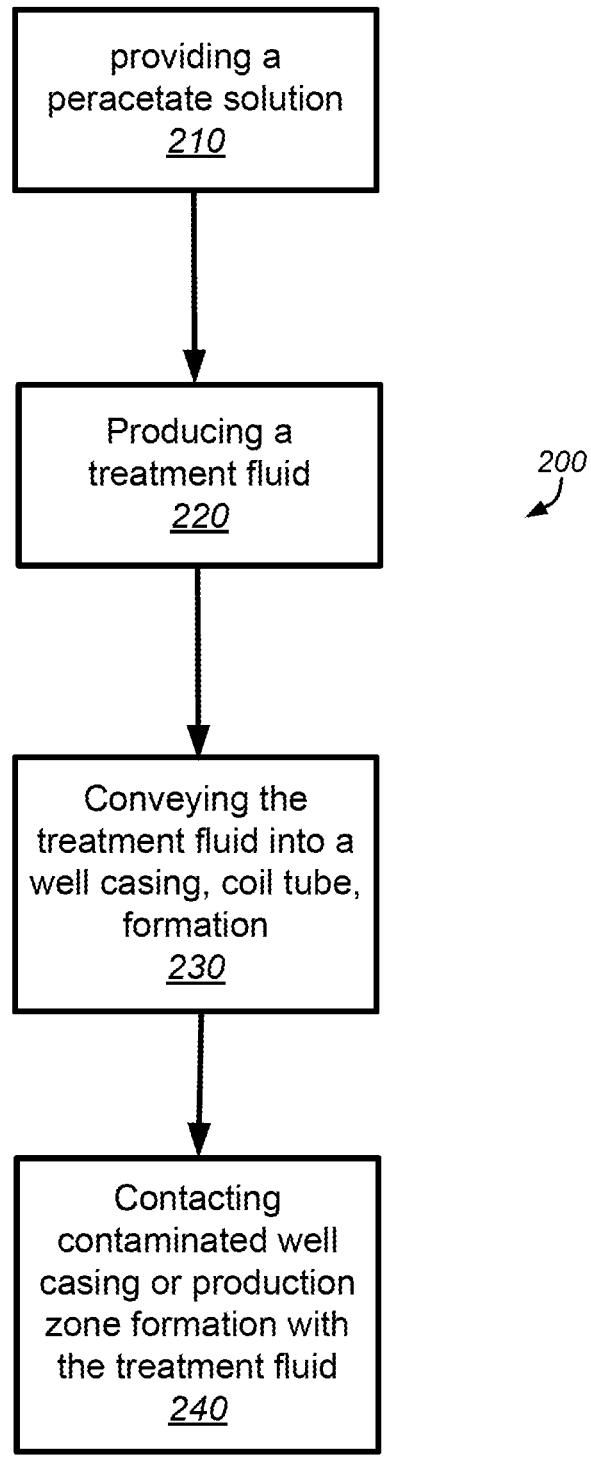
FIG. 2 depicts a graphical representation of a flow chart of a method to mitigate and/or remediate sulfur based contaminants and other contaminants affecting a production zone and/or production equipment associated with the production zone.

In some embodiments, the $H_2S$ mitigation may be conducted by down-hole treatment of production wells with a treatment fluid containing sodium peracetate oxidant solution. FIG. 2 depicts a graphical representation of a flow chart of a method (200) to mitigate and/or remediate sulfur based contaminants and other contaminants affecting a production zone and/or production equipment associated with the production zone. In some embodiments, a method includes providing a peracetate solution (210). The method may include producing a treatment fluid (220) by combining the peracetate solution with, for example, a carrier fluid and/or other chemicals. The method may include conveying the treatment fluid into portions of a production zone, and/or production equipment in the production zone (230). The method may include contacting contaminated well casing and/or production zone formation with the treatment fluid (240). Other benefits of the treatments may be realized such as odor control, increased safety, and emulsion breaking for better separation of oil, water, and emulsified solids.

In some embodiments, sodium peracetate oxidant solutions may be placed in a carrier fluid to make well treatment injection fluids. Such treatment fluids may be used to perform, for example, an acid treatment, antimicrobial treatment, well desouring, or a well squeeze to stimulate hydrocarbon production from an oil and/or gas production well. Such treatment fluids may be used to increase permeability of a disposal well to increase the fluid disposal rate by the use of sodium peracetate oxidant solution. Such treatment fluids may be used to treat for iron and sulfate reducing bacteria contamination in groundwater wells.

In some embodiments, the carrier fluid containing the peracetate oxidant solution, treatment fluid, is injected into a pipeline, a sale line, a heater treater, a tank or other fluid transfer line or containment vessel to disrupt and remove biological growth, biofilms, scale deposits and iron sulfide deposits from surfaces. In some embodiments, after the treatment fluid is injected into the fluid transfer line or containment vessel the treatment fluid may be conveyed in a single pass or re-circulated or shut in to provide additional contact time for treatment. After treatment, the spent treatment fluid is conveyed or drained from the treated area. In some embodiments, treatments with peracetate oxidant solution can be conducted alone or in combination with other treatments conducted in a similar manner including acid treatment and detergent treatment.

In some embodiments, the sodium peracetate oxidant solution may oxidize iron sulfides, oxidize hydrogen sulfide, kill hydrogen sulfide-producing bacteria, degrade and remove biofilms, oxidize and remove iron sulfide deposits and degrade polymer gels to enhance their removal from a formation. The removal of calcium carbonate and other scaling minerals may be achieved with traditional acid treatments used in a well treatment program utilizing sodium peracetate oxidant formulations in combination with mineral acids, organic acids, and chelating agents. In some embodiments, a well treatment with a sodium peracetate-containing treatment fluid may be conducted in a well treatment sequence (e.g., such as before or after an acid treatment or during a coil tube job).

One benefit of using the sodium peracetate oxidant solutions for oilfield $H_2S$ control applications is the low levels of benign hydrocarbon byproducts (e.g., glycerol and sodium acetate). This is in contrast to the use of triazine $H_2S$ scavengers, which produce byproducts such as organic amines (problematic for produced water treatment) and organic polysulfides (which may foul and build up on equipment due to their insolubility in water, oil and organic solvents).

Another benefit of the sodium peracetate oxidant solution is that it oxidizes hydrogen sulfide very rapidly, qualitatively faster than several other competing contaminant oxidation reactions, and may be very efficient at doing so. In some embodiments, a molar ratio of about 1.3:1 to 2:1 sodium peracetate to $H_2S$ is effective for $H_2S$ treatment in highly impaired or contaminated water. In some embodiments, oxidation of $H_2S$ with the sodium peracetate oxidant solution does not acidify the treated fluid in contrast to $H_2S$ oxidation with chlorine dioxide or chlorine, which produces hydrochloric and sulfuric acids as a byproducts. The simplest of such reactions are summarized in equations 1 and 2.

$$H2S+NaOOC(O)CH3 \rightarrow NaOC(O)CH3+H20+S \quad (1)$$

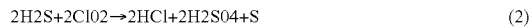

$$2H2S+2ClO2 \rightarrow 2HCl+2H2SO4+S \quad (2)$$

Reactions (1) and (2) are idealized, whereas in practice the oxidant:$H_2S$ ratio may be significantly greater depending on the environment in which the oxidation is occurring. Environmental factors include pH, concentration of elemental sulfur, and the concentration of other rapidly oxidized materials. Increasing any of these environmental factors may increase oxidant consumption. Excess oxidant may oxidize elemental sulfur to sulfate at a slower rate. In some embodiments, the colloidal, elemental sulfur produced by $H_2S$ oxidation may be removed in a water clarification process thereby minimizing the amount of sulfate added to the treated water. The presence of sulfate is a concern in water reused for well completions or floodwater injections.

In some embodiments, sodium peracetate solutions may be up to 10 times less corrosive to black steel coupons at 60° C. than chlorine dioxide in 17% salt water using 0.2% wt/vol oxidant concentration. The sodium peracetate oxidant solution may not blister black steel while chlorine dioxide causes severe blistering. The sodium peracetate oxidant solution may be virtually non-corrosive to 304 stainless steel in fresh water.

In some embodiments, sodium peracetate oxidant solutions may accelerate emulsion breaking and oil-water separation. In some embodiments, the use of sodium peracetate in well head fluids and crude oil for emulsion breaking and oxidizing hydrogen sulfide is preferably limited to doses such that the oxidant is fully consumed and does not leave a residual of active oxidant and does not contribute a significant amount of oxygen gas to the liquid or vapor phases. In some embodiments, use of at least 5 ppm, but less than about 40-50 ppm oxidant concentration is effective for accelerating emulsion breaking in production fluids and crude oil. This relatively low oxidant concentration range does not leave an active residual, it is rapidly consumed, as shown by the lack of effect on the oxidative-reductive potential (ORP) of fluids after treatment. The presence of hydrogen sulfide in production fluids and crude oil increases the oxidant demand and additional oxidant is required in proportion to the amount of hydrogen sulfide present.

A challenge of using sodium peracetate oxidant solutions is its short half-life, which is about 80 minutes for a 7% sodium peracetate solution in clean water (described in PCT Publication No. WO/2014/039929A1 to Buschmann) These solutions must be produced at or near the point of use and cannot be stored for significant periods of time in a container. However, the sodium peracetate oxidant solutions were discovered to be stable enough, when diluted to below 1% concentration, to have a working time practical for producing large volumes of treatment fluids in a tank for down-hole well treatment applications including hydrogen sulfide mitigation, bacteria reduction, iron sulfide scale cleaning and polymer gel breaking.

In some embodiments, to conduct a well treatment a large, diluted volume of sodium peracetate oxidant solution is preferably staged in a carrier fluid having no oxidant demand. The carrier fluid may include fresh water, salt water, treated production water and, optionally, combined with other treatment chemicals such as hydrochloric acid, citric acid, acetic acid, acid-containing micellar solvent, corrosion inhibitor, and iron chelant. Lower concentrations, less than 1%, of sodium peracetate oxidant may be staged for a limited period of time with small losses in active oxidant. For example, a 0.25% solution is expected to lose about 4-6% of its active sodium peracetate per hour at 20° C. A container, tank or tanker truck of sodium peracetate solution must be vented to release oxygen gas byproduct evolved from the oxidant as it naturally degrades in a carrier fluid.

The carrier fluid containing the peracetate oxidant solution, the treatment fluid, may be injected into the well with an injection pump having a suitable pressure rating (e.g., either directly into the annulus of a casing not hydraulically isolated from the production zone (e.g., gas is produced from the casing side) or into a tube in the annulus which penetrates the packer sealing the base of the annulus from the production zone). As the treatment fluid is injected into the well the head pressure of the fluid in the annulus or tube in the annulus will oppose the well pressure and reduce the injection pressure. In some cases the head pressure may exceed the well pressure and cause the well pressure at the surface to become negative (less than atmospheric), thereby allowing the fluid injection to occur more rapidly using a lower pressure, higher volume injection pump. After the treatment fluid is injected into the well the well may be shut in for up to about 2 hours before production is resumed. Thereby allowing the oxidant and other chemicals added to disrupt and remove, for example, biological growth, biomass deposits, scale deposits, iron sulfide deposits, polysaccharides and other materials that may cause the evolution of hydrogen sulfide, generate iron sulfide deposits and reduce the permeability of the formation in the well's production zone.

Injection of sodium peracetate-based treatment fluids down-hole may follow different strategies depending on the structure and size of the well. Treatment of the vertical casing may be necessary in wells without a packer at the base of the production tube. Treatment of the perforated zone (e.g., production zone) may require very large volumes of fluid to reach or a coil tube job may be conducted to direct the treatment fluid's placement. Treatment of the production tube may require producing fluid from a well during injection of the treatment fluid. For example, treatment of newer lateral wells requires much larger volumes of fluid than shorter vertical wells. In some cases the injection of a first volume of treatment fluid may be followed by injection of a second volume of water (e.g., production water, fresh water, brine, reclaimed water) to push the treatment fluid farther into a long lateral or formation. Treatment of both the casing and the production tube may be achieved by not shutting in the well during and after the injection of treatment fluid.

In some embodiments, recovering a $H_2S$-soured well may require multiple treatments. An initial shock treatment program may consist of an aggressive treatment once a week for three or four weeks. After the initial shock treatment or multiple shock treatments a maintenance schedule may be used to maintain the integrity of the well and quality of hydrocarbons being produced. The maintenance schedule could include a milder well treatment every 10 days to every 30 days depending on the rebound rate of $H_2S$ production.

Treatments for hydrogen sulfide above ground may be conducted with sodium peracetate oxidant solutions anywhere fluids are being transferred or conveyed through a pipe or suitable conduit. Crude oil, gas and water from a production well may be treated as they enter a separator, such as a heater treater. Treatment of crude oil exiting a heater treater or entering a gunbarrel may be conducted such that they reduce hydrogen sulfide and promote emulsion breaking to improve crude oil quality. A pipeline carrying fluids, including crude oil or water, may be treated by injection of the appropriate amount of sodium peracetate oxidant solution. Water containing high levels of hydrogen sulfide may be treated directly with sodium peracetate oxidant solution to oxidize all of the hydrogen sulfide dissolved in the water, which may be conducted efficiently in a water clarification process. Alternatively, high $H_2S$ water may be treated in multiple steps by gas stripping the bulk of $H_2S$ followed by an oxidative polish with sodium peracetate oxidant solution.

EXAMPLES

Having now described the invention, the same will be more readily understood through reference to the following example(s), which are provided by way of illustration, and are not intended to be limiting of the present invention.

Example 1: Production of an Oxidant Fluid for Well Treatment

[Edited version of Exhibit G, Example R in 7877-6-PROV] In this example a diluted sodium peracetate oxidant solution is staged in 500 barrel (21,000 gal) quantities produced in a 55 minute period. A 5.4% sodium peracetate oxidant solution is produced by the method described in PCT Publication No. WO/2014/039929A1 to Buschmann at a production rate of 50 L/min (13 gpm), which is then diluted to a concentration of 0.2% with bulk dilution water having negligible oxidant demand. The bulk dilution water may be fresh water, produced water or a brine previously treated with sodium peracetate oxidant solution to remove oxidant demand specific to the sodium peracetate oxidant. Approximately a 4% loss of active oxidant concentration is expected in 55 minutes at 25° C. Reducing the oxidant concentration or reducing oxidant solution pH to below pH 6.5 may also reduce the oxidant degradation rate for longer production or staging times. Mineral acids and organic acids or metal chelating acids may be used for this pH adjustment. Hydrochloric acid and citric acid are two examples. Sodium acetate and acetic acid, which are beneficial metal-complexing organic acids, are produced by the oxidant solution formulation as the oxidant is consumed.

The staged sodium peracetate oxidant and other chemicals are then pumped through coiled tubing to displace the volume of fluid in the hole with the treatment chemicals. The coiled tubing and a wash tool may be moved across casing perforations to increase the coverage of the treatment. Placement of the coil tubing and wash tool in proximity to $H_2S$-generating biological deposits may be guided by the use of a sensor, such as the sensor described in US 2014/0212983. The well may be shut in for at least 2 hours after treatment.

Example 2: Treatment of $H_2S$ Contaminated Production Well

In this example an oil and gas well in northwest North Dakota, USA, which had become soured with hydrogen sulfide over time, was injected with a first volume of sodium peracetate-based treatment fluid followed by injection of a second volume of production water to push the treatment fluid farther into the well and formation.

The well had approximately a 19,000 ft heel and lateral and the lateral was approximately 7000 ft below surface. The treatment fluid was a 0.25% sodium peracetate oxidant solution, which was staged in a 176 barrel (7,400 gal) volume by adding 400 gal of 4.3% sodium peracetate oxidant solution concentrate to about 167 barrels (7,000 gal) of fresh water carrier fluid. The 400 gal of 4.3% oxidant concentrate was produced in about 110 minutes using the oxidant production system (described in PCT Publication No. WO/2014/039929A1 to Buschmann or U.S. Provisional Patent Application Ser. No. 62/046,097 to Buschmann) The oxidant concentrate was injected into the tanker of fresh water carrier fluid as the oxidant was produced. A pump was used to recirculate the mixture in the tanker to disperse the oxidant uniformly in the carrier fluid. The production of the 0.25% sodium peracetate oxidant treatment fluid was conducted in a safe location a short distance from the well pad.

The pump jack of the well to be treated was turned off. The tanker of 0.25% sodium peracetate-based treatment fluid was moved to the well head where the injection pump was attached to the well head and the oxidant solution was pumped down the annulus of the well. Injection of the treatment fluid began about 10 minutes after production of the fluid was completed. The annulus pressure was initially near 50 psig, but decreased to zero or less after several barrels of fluid were pumped down hole. Injection of the treatment fluid took about 40 minutes to complete.

After injection of the treatment fluid about 100 barrels (4,200 gal) of production water was injected on top of the treatment fluid to push the treatment fluid further into the well lateral. Injection of the production water took about 25 minutes. The well was shut in about 1 hour before the pump jack was turned back on.

Before treatment the $H_2S$ reading on the gas side (gas from casing) at the well head using a Draeger tube analysis was 150 ppm. One day after treatment this reading was 10 ppm. Twelve days after treatment this reading was 0 ppm. Six days after treatment analysis of the fluid side (fluid produced from the well head) was 250 ppm $H_2S$ in the vapor phase above the fluid. Two weeks after treatment, analysis of the well's crude oil from the heater treater (tested by method UOP 163) measured 4 ppm $H_2S$ in the oil phase.

Example 3: Treatment of Heater Treater

About 5 bbls of the treatment fluid produced in Example 1 were retained in the tanker. The tanker was moved to the well's heater treater and the injection pump was connected to the manifold entering the treater. The 5 barrels of treatment fluid were pumped into the heater treater. Before treatment the $H_2S$ in the vapor phase above the oil sampled from the heater treater was 400 ppm using a Draeger tube analysis. Two days after treatment this $H_2S$ reading was 0 ppm.

Example 4: Treatment of $H_2S$ Contaminated Production Well

[two stage, to treat into formation and production tube]: In this example an oil and gas well in northwest North Dakota, USA, which had become soured with hydrogen sulfide over time, was injected with a first volume of sodium peracetate-based treatment fluid to treat the well below the production tube while the pump jack was idle followed by injection of a second volume of sodium peracetate-based treatment fluid with the pump jack turned on to draw the fresh treatment fluid up through the production tube to provide treatment up to the well head.

The well had a similar structure and geometry to that described in Example 2. The treatment fluid was a 0.33% sodium peracetate oxidant solution, which was staged in a 130 barrel (5,450 gal) volume by adding 410 gal of 4.3% sodium peracetate oxidant solution concentrate to about 120 barrels (5,040 gal) of fresh water carrier fluid. The 410 gal of 4.3% oxidant concentrate was produced in about 115 minutes using the oxidant production system (described in PCT Publication No. WO/2014/039929A1 to Buschmann or U.S. Provisional Patent Application Ser. No. 62/046,097 to Buschmann) The oxidant concentrate was injected into the tanker of fresh water carrier fluid as the oxidant was produced. A pump was used to recirculate the mixture in the tanker to disperse the oxidant uniformly in the carrier fluid. The production of the 0.33% sodium peracetate oxidant treatment fluid was conducted in a safe location a short distance from the well pad.

The pump jack of the well to be treated was turned off. The tanker of 0.33% sodium peracetate-based treatment fluid was moved to the well head where the injection pump was attached to the well head and the oxidant solution was pumped down the annulus of the well. Injection of the treatment fluid began about 10 minutes after production of the fluid was completed. The annulus pressure was initially near 75 psig, but decreased to zero or less after several barrels of fluid were pumped down hole. Injection of the treatment fluid took about 20 minutes to complete.

The well was left shut in while a second volume of 0.33% sodium peracetate oxidant treatment fluid was produced and staged in a 130 barrel (5,450 gal) volume as before. The tanker of 0.33% sodium peracetate-based treatment fluid was moved to the well head where the injection pump was attached to the well head and the oxidant solution was pumped down the annulus of the well. Injection of the treatment fluid began about 10 minutes after production of the fluid was completed. The annulus pressure was still near zero psi. During injection of the second volume of treatment fluid the pump jack was turned back on to draw newly injected treatment fluid up the production tube.

Before treatment the $H_2S$ reading on the fluid side (fluid produced from the well head) was 1100 ppm $H_2S$ in the vapor phase above the fluid using a Draeger tube analysis. One day after treatment this reading was 400 ppm.

Example 5: Gel Breaking Ability for Well Squeeze to Remove Polymer Gels

The incomplete removal of gelling polymers after a hydrofractured well completion may result in reduced permeability and well productivity. Breakers, such as chlorous acid or sodium persulfate, are added to crosslinked polysaccharide gel systems to reduce the viscosity of the gel after a period of time in the formation so that it may be pumped out of the formation after hydrofracturing is conducted. Common breakers such as sodium chlorite and sodium persulfate are effective at breaking the crosslinker, but not always effective at breaking down the polysaccharide chain structure into smaller, less viscous fragments. As a result, the high molecular weight polysaccharide may not be efficiently removed from the pores in a fractured zone leading to "polymer damage" and reduced permeability.

Two chemical degradation pathways are of importance m the breakdown of polysaccharide-based gels:
1) Hydrolysis of glycoside linkage causing scission of the polysaccharide chain, typically by acid hydrolysis; and
2) Oxidative/Reductive depolymerization (ORD) reactions involving radical pathways in the presence of oxygen species, such as superoxide, as the radical initiator for further breakdown reactions.

The use of the sodium peracetate oxidant formulation was tested for the depolymerization and break down of guar gum. It was discovered that elevated concentrations, about 440 mg/L, of the sodium peracetate oxidant significantly reduce the viscosity of guar gum within about 2 hours as described below. Low concentrations, about 65 mg/L, of the sodium peracetate oxidant had no visible effect on viscosity, but did act as a preservative such that naturally occurring microbes and/or enzymes did not break down the guar gum for at least a week.

The guar mixture was made by rapidly mixing 10 g/L food grade guar gum powder into a 10 g/L sodium chloride solution in distilled water. The blended mixture was heated to about 35-40° C. in a heated water bath for at least one hour to fully hydrate the guar. The mixture appeared translucent with fine, milky white suspended solids. The viscosity of the guar mixture was comparable to that of honey based on its flow behavior. Several 60 mL portions of the guar mixture were prepared for different treatments as summarized in Table I. The first was a control sample to which no oxidant was added. The remaining samples had increasing amounts of sodium peracetate oxidant added to them. The oxidant was prepared as described in PCT Publication No. WO/2014/039929A1 to Buschmann and the pH was adjusted to about 9.1 with sodium bisulfate before use. The oxidant was rapidly mixed with the guar mixture resulting in a pale yellow color. The mixtures were placed in a water bath at about 35-40° C. and the yellow color gradually faded away over the next hour. After two hours the samples were cooled to room temperature.

TABLE I

| Oxidant Conc. (mg/L) | Viscosity at 2 Hour Contact Time |
|---|---|
| 0 | same as initial |
| 65 | same as initial |

TABLE I-continued

| Oxidant Conc. (mg/L) | Viscosity at 2 Hour Contact Time |
|---|---|
| 220 | slightly reduced |
| 440 | very reduced |

The control sample remained viscous for a day, but lost viscosity after sitting at room temperature overnight and microbial growth as a biofilm was visible after a week. The sample treated with about 65 mg/L oxidant retained its original viscosity and milky color for at least a week and no microbial growth was observed. The sample treated with about 220 mg/L oxidant had a small reduction in viscosity, but did not clear of its suspended material. The sample treated with about 440 mg/L oxidant had a rapid loss of viscosity over the first hour and was similar to a light vegetable oil in its flow behavior. The fine, suspended solids settled out leaving a clear, colorless solution. A second treatment of the last sample reduced the viscosity further by a small amount.

Example 6: Treatment of a Ground Water Well

In this example a groundwater well producing from the Laramie-Fox Hills aquifer in Colorado, USA had become contaminated with iron and sulfate reducing bacteria, which decreased the water quality for a municipality. The water contained an elevated concentration of iron and had a sulfury smell from a low level of 1425 caused by bacteria contamination.

The vertical well was about 800 feet deep, was a screened open design and had a submersible pump positioned about 650 feet below surface. The treatment fluid was a 0.33% sodium peracetate oxidant solution, which was staged in a 3,245 gal volume by adding 245 gal of 4.3% sodium peracetate oxidant solution concentrate to about 3,000 gal of fresh water carrier fluid contained in a water truck. The 245 gal of 4.3% oxidant concentrate was produced in about 70 minutes using the oxidant production system (described in PCT Publication No. WO/2014/039929A1 to Buschmann or U.S. Provisional Patent Application Ser. No. 62/046,097 to Buschmann) The oxidant concentrate was injected into the water truck as the oxidant was produced. A pump was used to recirculate the mixture in the water truck tank to disperse the oxidant uniformly in the carrier fluid. The production of 0.33% sodium peracetate oxidant treatment fluid was conducted a short distance from the well head.

The water level in the well was drawn down as much as possible, the submersible pump was turned off and the well production isolated from the municipal water system. The water truck containing the 0.33% sodium peracetate-based treatment fluid was moved to the well head where the injection pump was attached to the well head and the oxidant solution was pumped down the casing of the well. About 2 hours after the fluid injection was completed the submersible pump was turned back on and the well was allowed to flow back and produce for about 6 hours at 50 gpm before the well was reconnected to the municipal water system.

Example 7: $H_2S$ Removal from Production Well Fluids and Gas and Enhanced Oil-Water Separation of Crude Oil Hydrogen sulfide-containing production fluids and gas from an oil and gas production well are treated with a reactive oxygen species-generating solution based on sodium peracetate oxidant solution (described in PCT Publication No. WO/2014/039929A1 to Buschmann or U.S. Provisional Patent Application Ser. No. 62/046,097 to Buschmann) to remove hydrogen sulfide and enhance emulsion breaking as the fluids are transferred from a well head to a heater treater. The $H_2S$ content in the gas and water streams exiting the heater treater will be significantly reduced. The fluid enriched in crude oil that exits the heater treater may be treated again as it is transferred to a gunbarrel to remove residual hydrogen sulfide and further enhance oil-water separation in the gunbarrel, thereby improving the quality of the crude oil. A continuous stream of sodium peracetate oxidant solution is injected into the feed pipe leading to one or a multiplicity of heater treaters on a well pad or centralized collection facility. A continuous stream of sodium peracetate oxidant solution may also be injected into the feed pipe exiting the heater treater(s) or entering one or a multiplicity of gunbarrels on a well pad or centralized collection facility.

A well pad with two lateral wells that produce a total of about 1000 barrels per day of production fluid is equipped with two heater treaters housed in the same containment structure. The fluids produced from each well, containing about 30 mg/L of hydrogen sulfide in the liquid phase, are conveyed to the two heater treaters operating at about 50 psig where gas is separated from liquid phases and a primary crude oil-water separation occurs. The gas exits the heater treater to a sale line. The water exits the heater treater and is conveyed to a water tank battery. The crude oil exits the treater and is conveyed to a gunbarrel tank battery.

A first treatment of the production fluids and gas entering the heater treaters is conducted by injecting a small stream of a 4.5% sodium peracetate oxidant solution at a rate that provides about 50 mg/L oxidant concentration diluted into the liquid phase. At a liquid flow rate of 21 barrels (875 gal) per hour per heater treater the sodium peracetate oxidant solution is injected into the pipe or manifold upstream of the heater treater at a rate of 1.25 gallons per hour per heater treater. The hydrogen sulfide concentration in the gas is reduced to less than 70 ppm in the vapor phase (gas phase) and to about 2 ppm or less in the liquid phase. Oil-water emulsions and oil-water-solids emulsions are disrupted by a partial oxidation of the reactive oils and contaminants at the oil-water interface causing a more rapid coalescence and separation of oil from water and water from oil.

A second treatment of the partially dewatered crude oil exiting the heater treaters and conveyed to a gunbarrel tank battery is conducted by injecting a small stream of a 4.5% sodium peracetate oxidant solution at a rate that provides about 15 mg/L oxidant concentration diluted into the liquid phase. At a crude oil flow rate of about 4.2 barrels (175 gal) per hour per heater treater the sodium peracetate oxidant solution is injected into the pipe or manifold downstream of the heater treater at a rate of 0.25 gallons per hour per heater treater. The hydrogen sulfide concentration in the gas is reduced to less than 10 ppm in the vapor phase and to about 0.1 ppm or less in the liquid phase. Oil-water emulsions and oil-water-solids emulsions are further disrupted by a partial oxidation of the reactive oils and contaminants at the oil-water interface causing a more rapid coalescence and separation of water from oil in a gunbarrel separator resulting in greater oil recovery and lower water and emulsified solids content in the oil.

The amount of 4.5% sodium peracetate oxidant solution required for the above two heater treaters is about 3 gallons per hour, which is generated by a single sodium peracetate oxidant solution generator and is delivered to each of the four injection points by four injection pumps drawing from the single generator.

Example 8: H$_2$S Reduction at Crude Oil Shipping or Receiving Depot

Hydrogen sulfide-containing crude oil is treated with a reactive oxygen species-generating solution based on sodium peracetate oxidant solution (described in PCT Publication No. WO/2014/039929A1 to Buschmann or U.S. Provisional Patent Application Ser. No. 62/046,097 to Buschmann) to remove hydrogen sulfide to reduce or eliminate exposure hazards to hydrogen sulfide during the loading of rail cars at a crude oil depot, the offloading of rail cars at a refinery and accidental releases into the environment, especially in populated areas.

Treatment for H$_2$S was conducted at a crude oil rail depot in North Dakota, USA as crude oil is transferred from crude oil collection and storage tanks to rail cars used to transport the crude oil to a refinery. A small stream of a 4.5% sodium peracetate oxidant solution was injected into the crude oil transfer line at a rate that provides about 40 ppm oxidant concentration diluted into the liquid phase to treat a H$_2$S concentration of about 20-30 ppm. Crude oil was transferred and loaded onto a rail tanker car at a rate of about 48 barrels (2000 gallons) per minute. At this transfer rate about 1.8 gallons per minute of a 4.5% sodium peracetate oxidant solution was injected into the crude oil transfer line to provide about 40 ppm oxidant concentration diluted into the liquid phase, which may treat up to 20-30 ppm H$_2$S. The hydrogen sulfide concentration in the liquid phase was reduced to less than about 5 ppm and the vapor phase potential (e.g., in cargo head space) was reduced to less than 70 ppm at 140° F.

Example 9: High H$_2$S Crude Oil Treatment Depot

Some oil producing regions have crude oil with high levels of hydrogen sulfide. For example, oil producing formations in north west North Dakota, north east Montana and south Saskatchewan, Canada contain high levels of H$_2$S that result in crude oil being delivered to more distant cross-border crude oil depots or alternative refineries that are willing to handle, transport and process high H$_2$S crude oil. An alternative to this is treating the crude oil in a tanker truck to reduce the H$_2$S content to commonly acceptable levels. Reducing the level of hydrogen sulfide in crude oil at a regional depot will reduce the transportation costs, hazards and logistics while improving crude oil value. The treatment process may be conducted at a regional depot where the crude oil in a tanker truck is turned over for H$_2$S treatment.

A standard crude oil tanker truck pulls up to a terminal station where the tanker pumps its fluid through a treatment pipe into a temporary holding tank. During transfer of the crude oil fluid a small stream of a 4.5% sodium peracetate oxidant solution is injected into the crude oil transfer and treatment pipe at a rate that provides about 40 ppm oxidant concentration diluted into the liquid phase to treat a H$_2$S concentration of about 20-30 ppm. At a crude oil transfer rate of about 10 barrels (420 gallons) per minute about 0.38 gallons per minute of a 4.5% sodium peracetate oxidant solution injected into the crude oil transfer and treatment pipe. The crude oil may be evaluated for H$_2$S in the holding tank and treated a second time if necessary while the tanker pumps the crude oil from the temporary holding tank through the same treatment pipe back into the tanker truck. The treated crude oil will preferably contain less than 10 ppm H$_2$S. A tanker truck hauling 200 barrels of crude oil is treated by this method in about 40 minutes. Several of the above terminal stations, each outfitted with a crude oil transfer and treatment pipe and temporary holding tank, may be provided at a single depot location that may serve several tanker trucks per hour. A single sodium peracetate oxidant solution generator may service multiple terminals with multiple oxidant solution feed pumps, operating independently of one another, but drawing off of a single oxidant generation system.

Example 10: Treatment of Crude Oil Fluids at a Crude Oil Tank Battery for H$_2$S Reduction and Emulsion Breaking for Water Separation Gunbarrel separators are used in the oilfield to allow crude oil to separate from water to improve the quality of the crude oil before it is transported to a refinery. Some crude oils contain significant concentrations of hydrogen sulfide posing significant exposure hazards to crude oil haulers and personnel working around and servicing tanks, pipes and containment equipment containing "sour crude." Some crude oils are strongly emulsified with water and solids such as iron, silt, asphaltenes, paraffin and other materials extracted from a hydrocarbon-bearing formation. When these emulsions are not broken and oil-water separation in the gunbarrel is poor the quality of the crude may be too low for collection and sale.

Crude oil produced out of a gunbarrel at a tank battery is collected in crude oil tanks. If the collected crude oil is too low in quality to sell it may be treated with the sodium peracetate oxidant solution to reduce hydrogen sulfide and break emulsions more rapidly. Treatment occurs while the crude oil is returned to the gunbarrel from a crude oil collection tank through a return line. Injection of a relatively low dose of the sodium peracetate oxidant solution into the return line is done to reduce hydrogen sulfide and break emulsions more rapidly thereby improving the quality of the crude oil produced from a gunbarrel.

A sodium peracetate oxidant solution generator mobilized with feedstocks and contained in a trailer was brought to a crude oil tank battery located outside of Pecos, Tex., USA. Three of the six crude oil collection tanks had been identified as contained badly emulsified fluids and some hydrogen sulfide. The gravity of the crude was about 20° API A return line between the collection tanks and gunbarrel had been outfitted with a valve as an injection point for chemicals. During transfer of the crude oil fluid a small stream of a 4.5% sodium peracetate oxidant solution is injected into the crude oil transfer and treatment pipe at a rate that provides about 40 ppm oxidant concentration diluted into the liquid phase to break emulsions and treat a H$_2$S concentration of about 5 ppm. At a crude oil transfer rate of about 2 barrels (84 gallons) per minute about 4.6 gallons per hour of a 4.5% sodium peracetate oxidant solution injected into the crude oil return line. The crude oil produced from the gunbarrel was better separated from water and emulsified impurities. The gravity of the treated crude was about 37° API.

Example 11: Oxidation of H$_2$S in Production Water

Removal of hydrogen sulfide from water is more efficient using a sodium peracetate oxidant solution due to its ability to oxidize hydrogen sulfide to colloidal sulfur intermediates faster than it oxidizes colloidal sulfur intermediates to sulfate.

A production water at a salt water disposal well near Odessa, Tex., USA was tested for hydrogen sulfide treatment. The production water was tested for $H_2S$ using the HACH test kit for sulfide as $S^{2-}$ (methylene blue method). The initial sulfide concentration was measured at 150 mg/L (4.68 mM), the initial pH was 6.7 and there was no detectable iron. A 500 mL sample of the water was stirred rapidly while adding a sodium peracetate solution concentrate to provide a total dose of 360 mg/L (3.68 mM) sodium peracetate. A pale yellow haze formed rapidly indicating that colloidal sulfur had been formed. The final sulfide concentration was measured as 58 mg/L (1.81 mM), the pH was 7.2 and there was no residual oxidant. The molar ratio of sodium peracetate oxidant to sulfide removed was 1.3:1. The colloidal sulfur was oxidized readily with an excess of sodium peracetate oxidant as indicated by the solution clearing.

Example 12: Removal of $H_2S$ from Production Water

Production water from the same region as in Example 11 was tested for hydrogen sulfide treatment in a water clarification process. Colloidal sulfur was primarily removed with flocculated solids and by further oxidation to sulfate. The production water was from a mixture of sources at a salt water disposal well and contained hydrogen sulfide, iron, iron sulfide, oil and other organic impurities. The water was black with suspended solids and contained 22 mg/L (0.71 mM) hydrogen sulfide, 56 mg/L total iron, was pH 7.3 and had a total microbial load in the range of 5-10 million cells/mL. It was anticipated that about 90 mg/L (0.92 mM) sodium peracetate oxidant dose would be required to remove the hydrogen sulfide at a 1.3:1 molar ratio. An additional amount of oxidant would be required to remove iron, organic impurities and bacteria.

A 500 mL sample of the water was stirred rapidly while adding about 8 ppm of anionic flocculation polymer dispersion and 100 mg/L (9.8 mM) sodium peracetate oxidant. Large, black floe particles formed rapidly and the supernatant was clear. Hydrogen sulfide was reduced to 2 mg/L (0.06 mM) and the pH was 7.3.

The pH of the mixture was adjusted to pH 8.3 with a small amount of sodium hydroxide to enhance the clarification of suspended solids. The floe rapidly re-settled and the supernatant was filtered through a 25 micron filter bag. The filtered water was polished with another 60 mg/L sodium peracetate oxidant to remove the last traces of hydrogen sulfide, oxidize any remaining colloidal sulfur to sulfate and reduce the microbial population. The final pH was 8.2, sulfide and iron were undetected, and total suspended solids was about 9 mg/L.

Example 13: Hydrogen Sulfide and Odor Control in a Water Impoundment Pond

Containment used for impoundment, storage or evaporation of water produced in the oilfield is often a source of odors, including hydrogen sulfide and decaying organic materials and algae blooms during the warmer months of the year. As microbial growth increases the impounded water often becomes anoxic resulting in the microbial production of hydrogen sulfide, reduced nitrogen compounds and decay of accumulated microbial detritus.

Odors produced by a lined 50,000 barrel frac pond in northwest Virginia, USA had become a problem for nearby residents. The water had also become fouled and was no longer suitable for reuse. A mobile sodium peracetate oxidant solution generation system was deployed to the site along with two 600 gallon per minute water pumps each outfitted with six-inch intake lines to draw water from the impoundment at a first location and elevation, chemical injection ports positioned on the intake side of the pumps and six-inch discharge lines to return water to a second location and elevation in the impoundment to promote good mixing and turnover of the water volume. Two sodium peracetate oxidant dose pumps were outfitted on a single generation system. Feedstock chemicals and fresh water for producing oxidant solution were staged on site prior to starting treatment.

During treatment the impounded water was pumped at a rate of 500 gallons per minute through each pump while a 4.5% sodium peracetate oxidant solution was injected upstream of each pump at a rate of 1.1 gallons per minute per oxidant dose pump to provide an injected oxidant concentration of 100 ppm. The pumps were used to mix the oxidant solution with the water. Water treatment was conducted long enough to turn over the impoundment volume about 1.5 times, which took about 52 hours and 6,900 gallons of oxidant solution to complete. Odors were eliminated and the oxygenated water clarified as oxidized solids settled over the next several days. Residual active oxidant attenuated to non-detectable concentration within a week.

Example 14: Prevention of Bacteria Contamination and Souring of a Water Flooding Injection Well Water flooding is used as a petroleum production stimulation method. Often the injection water is sourced from the produced water from the production well(s). Production water and other water sources, such as river water, are contaminated with bacteria and should be disinfected prior to injecting into a reservoir. Not doing so will rapidly lead to souring of the formation and possibly reducing a well's productivity.

In this example the flood water is production water. The production water is piped from a nearby well pad and staged in a battery of tanks near the injection wells. The water may be treated with sodium peracetate oxidant solution while it is being conveyed through a pipe to the storage tanks. Alternatively a tank of water may be treated in place by drawing the water from a tank through an oxidant solution injection pipe and mixer and then returning the water to the same tank or different tank.

Water treatment is conducted by pumping production water out of a tank through a four inch diameter hose outfitted with at least one injection point for adding oxidant and an inline flash mixer downstream of the oxidant injection point to blend the water with the oxidant. An ORP (oxidative reductive potential) sensor is positioned in the water flow downstream of the flash mixer. A 5% sodium peracetate oxidant solution is generated by the method described in PCT Publication No. WO/2014/039929A1 to Buschmann or U.S. Provisional Patent Application Ser. No. 62/046,097 to Buschmann. The ORP after the flash mixer should be maintained between about 680 and 750 mV vs standard hydrogen electrode by adjusting the injection rate of the sodium peracetate oxidant solution. The water is then returned to the tank at a different location (opposite end) than where the water is being drawn out of the tank. The volume of water in the tank is turned over about 1.5 times to raise the ORP in the tank to about 650 to 700 mV vs standard hydrogen electrode. The treated water is allowed to sit in the tank with about a 1 hour contact time before using to allow the oxidant to be consumed and lower the ORP of the water to less than about 500 mV. The water is then injected down hole for a water flood.

Example 15: Treating Polymer Damage from a Water Flood

Water floods are often conducted with added chemicals to increase the efficiency of crude petroleum extraction. Alkaline sodium silicate solutions and surfactant-based solutions may be used to reduce interfacial tension between water and crude petroleum phases. Polymers, such as polyacrylamides, are added as viscosity modifiers to the injection fluid to improve sweep efficiency. Polymers may reduce the injectability of the flood water over time when held up in the formation, which is sometimes referred to as polymer damage. This form of polymer damage may be treated with a down-hole treatment with a sodium peracetate oxidant solution to break down the polymer and allow it to be flushed away from the injection zone.

The use of elevated concentrations, greater than about 500 mg/L, of sodium peracetate oxidant solution was found to break down polyacrylarnides at room temperature. A solution of polyacrylamide exhibited a drop in solution viscosity over a 30 minute period and was more stable in solution (for example, the broken polymer was more difficult to coagulate than unbroken polymer).

The base of the injection well was about 8500 feet deep. The treatment fluid was a 0.33% sodium peracetate oxidant solution, which was staged in a 3,245 gal volume by adding 245 gal of 4.3% sodium peracetate oxidant solution concentrate to about 3,000 gal of brine water carrier fluid contained in a water truck. The 245 gal of 4.3% oxidant concentrate was produced in about 70 minutes using the oxidant production system (described in PCT Publication No. WO/2014/039929A1 to Buschmann or U.S. Provisional Patent Application Ser. No. 62/046,097 to Buschmann) The oxidant concentrate was injected into the water truck as the oxidant was produced. A pump was used to recirculate the mixture in the water truck tank to disperse the oxidant uniformly in the carrier fluid. The production of 0.33% sodium peracetate oxidant treatment fluid was conducted a short distance from the well head. The water truck was moved to the well head and the injection fluid was pumped down the injection well. The well was left shut in for about 2 hours before flood water injection was resumed.

Example 16: Efficient Treatment of High $H_2S$ Water for Water Flood Injection The efficient oxidative treatment of water containing high levels of hydrogen sulfide is problematic due to the high oxidant demand created by elevated concentrations of colloidal sulfur produced as an oxidation byproduct. Reducing the oxidant demand potential of suspended colloidal sulfur particles may be achieved by methods that by reducing the reactivity of the colloidal sulfur particles. Such methods include reducing the surface area of the suspended sulfur particles, coating the sulfur particle surfaces with a non-reactive material, and partitioning the majority of sulfur particles out of the liquid phase.

In this example the high $H_2S$ water was about 10,000 barrels of production water containing an average of about 400 ppm hydrogen sulfide and about $10^7$ bacteria cells per mL. The production water was contained in a tank battery and required treatment before transfer to working tanks staged near the injection well. Water treatment was conducted while transferring the untreated water from the first tank battery to the working tanks. The treatment goals were to reduce the $H_2S$ concentration and achieve a 5 to 6 log reduction in bacteria concentration. A combination of oxidant and flocculation polymer were sequentially added to the water as it passed through a series of hose, pipe, mixer and filter components arranged in-line between the tank battery and working tanks.

The high $H_2S$ production water was transferred from the tank battery through a 4 inch hose and pipe assembly at a rate of 250 gallons per minute by means of a first water transfer pump. The untreated water passed through a first pipe segment outfitted with injection quills where a first dose of sodium peracetate oxidant solution and a first dose of flocculation polymer were added. The water then passed through a first in-line static mixer and about 20 feet of hose to provide some contact time between oxidant, impurities and polymer. The water then passed through a second pipe segment outfitted with injection quills where a second dose of sodium peracetate oxidant solution and a second dose of flocculation polymer were added. The water then passed through a second in-line static mixer and about 20 feet of hose to provide some contact time between oxidant, impurities and polymer. The water then passed through a filter pod to remove the majority of suspended and flocculated solids from the water. The water then passed through a third pipe segment outfitted with an injection quill where a third dose of sodium peracetate oxidant solution was injected as a final treatment polish. The target oxidative-reductive potential (ORP) after the third oxidant dose was greater than about 600 mV vs standard hydrogen electrode. The treated water was finally conveyed to the working tanks near the well head, ready to be injected.

In the above treatment process the first dose of sodium peracetate oxidant solution provided about 750 ppm sodium peracetate in the water stream and the first dose of flocculation polymer provided about 10 ppm polymer in the water stream. The second dose of sodium peracetate oxidant solution provided about 750 ppm sodium peracetate in the water stream and the second dose of flocculation polymer provided about 5 ppm polymer in the water stream. The third dose of sodium peracetate oxidant solution provided about 350 ppm sodium peracetate in the water stream. The total sodium peracetate to hydrogen sulfide molar ratio was about 1.5:1.

The above treatment process may be more generally used to enhance oxidative treatment of high $H_2S$ water with a variety of other oxidants, in addition to sodium peracetate, which may produce colloidal sulfur particles as a primary oxidation byproduct that may be partitioned from the liquid phase. Examples of other oxidants include chlorine dioxide, hydrogen peroxide, peracetic acid, hypochlorite and hypochlorous acid.

Example 17: Removal of Bacteria and Sulfide from High $H_2S$ Water

This example describes chemical-physical methods for treating high $H_2S$ water by oxidizing hydrogen sulfide and other sulfide species while removing bacteria without using excessive amounts of oxidants. The process involves adding a first quantity of oxidant to oxidize a portion of the hydrogen sulfide to sulfur solids, which are then removed with a first portion of bacteria from the water in a first clarification step. A second quantity of oxidant is then added to oxidize the remainder of the hydrogen sulfide to sulfur solids, which are then removed with a second portion of bacteria from the water in a second clarification step. The finished water is clear, free of $H_2S$ and has a significantly reduced bacteria population. The progress of each oxidation step may be monitored by measuring the oxidative-reductive potential (ORP) of the water being treated. The amount of oxidant added to the water being treated may be adjusted and controlled in response to the ORP measurement.

A high $H_2S$ water sample near Odessa, Tex., USA was tested for $H_2S$ and bacteria removal. The untreated water appeared pale green-yellow, slightly hazy and had low oil content. The water was measured to contain 390 mg/L hydrogen sulfide (measured as $S^{2-}$), pH 7.3 and ORP of about −160 mV (vs SHE). Total bacteria were measured using a Luminultra™ ATP test method showing 280 pg/mL ATP concentration. Sulfate was 1000 mg/L and iron content was less than 5 mg/L.

A 600 mL portion of the water was transferred by siphon pump to a 1 L beaker outfitted with a magnetic stir bar, pH probe, ORP probe and a sealed cover with a small opening for adding chemicals. The solution was mixed at a moderate rate at room temperature using a magnetic stir plate while a 17% hydrogen peroxide solution was added in a 1.9:1 molar ratio of oxidant to sulfide to remove about 80% of the $H_2S$. Upon addition of hydrogen peroxide the ORP immediately increased (shifted more positive) to about 10 mV (vs SHE) and slowly decreased back to −160 mV as hydrogen peroxide reacted with $H_2S$ and the water became very cloudy and yellow. After 10 minutes of reaction time aluminum coagulant and anionic flocculation polymer dispersion were added causing a rapid flocculation and settling of most of the pale yellow solids. The clarified supernatant was decanted to a second beaker outfitted the same as the first. The supernatant contained about 60 mg/L $H_2S$ (as $S^{2-}$), 14 pg/mL ATP concentration and was pH 7.6. The ATP and corresponding bacteria population was reduced by about 95%.

A 500 mL portion of the supernatant above was mixed while a 2.1% sodium peracetate solution was added in a 1.6:1 molar ratio of oxidant to sulfide to remove the remaining 20% of the $H_2S$ and promote a final clarification and bacteria removal. Upon addition of the sodium peracetate solution the water became very cloudy in about 30 seconds and bleached to nearly white. The ORP immediately increased to about 30 mV (vs SHE) and increased to 70 mV in about 5 minutes. After 10 minutes of reaction time aluminum coagulant and anionic flocculation polymer dispersion were added causing a rapid flocculation and settling of the pale solids. The clarified supernatant was water clear and colorless. The supernatant contained no detectable $H_2S$ (less than 5 mg/L as S'), 3 pg/mL ATP concentration and was pH 6.9. The ATP and corresponding bacteria population was reduced by 99% relative to the untreated water. Sulfate was measured again at 1000 mg/L indicating that sulfide was removed primarily as solids before significant oxidation to sulfate occurred.

In the above example, the treated water or supernatant produced after the first oxidation-clarification treatment step may be used in an application, such as a water flood, where reducing the bacteria population is more important than removing all of the hydrogen sulfide.

In the above example the amount of $H_2S$ removed in each oxidation-clarification treatment step may be varied proportional to the amount of oxidant used in each step. For example, in some cases the oil content of the untreated water is high and less $H_2S$ oxidation should be conducted using hydrogen peroxide to avoid emulsification of oils. In this case, more or all $H_2S$ oxidation is conducted using sodium persulfate solution to avoid emulsification of oils into the water. Conversely, in water with virtually no oil content both oxidation-clarification treatment steps may be conducted with hydrogen peroxide. Optionally, small dose of sodium persulfate solution or other suitable oxidant may be added to the water after treatment to provide an antimicrobial residual and elevate the ORP above 600 mV.

The above example is implemented at a water treatment facility by adding a first portion of oxidant to the untreated water and providing a contact time in a first contact tank for the oxidant to be consumed while adding aluminum coagulant. After a suitable reaction time, an anionic polymer is added to promote flocculation and accelerate solids settling in a first clarifier. A second portion of oxidant is then added to the clarified water while it is conveyed to a second contact tank where the oxidant is consumed while adding aluminum coagulant. After a suitable reaction time, an anionic polymer is added to promote flocculation and accelerate solids settling in a second clarifier. The clarified water may be passed through a filter to polish out any carry-over of solids to produce a finished water containing no hydrogen sulfide and minimal bacteria.

Example 18: Increasing Reactivity of Hydrogen Peroxide with Hydrogen Sulfide

A $H_2S$ water sample collected near Odessa, Tex., USA contained 80 mg/L hydrogen sulfide (measured as $S^{2-}$), had a pH 7.8-7.9, ORP of about −140 to −160 mV (vs SHE) and the iron content was less than 5 mg/L. This water was used to demonstrate the shortening of reaction time to achieve $H_2S$ oxidation with hydrogen peroxide. Hydrogen peroxide is an inexpensive oxidant for $H_2S$ removal, but is slow acting relative to several other oxidants. Shortening the reaction time or contact time required in a water treatment process reduces the volume of contact basins or increases the throughput of a treatment process such as that described in Example 17.

Figure 3:
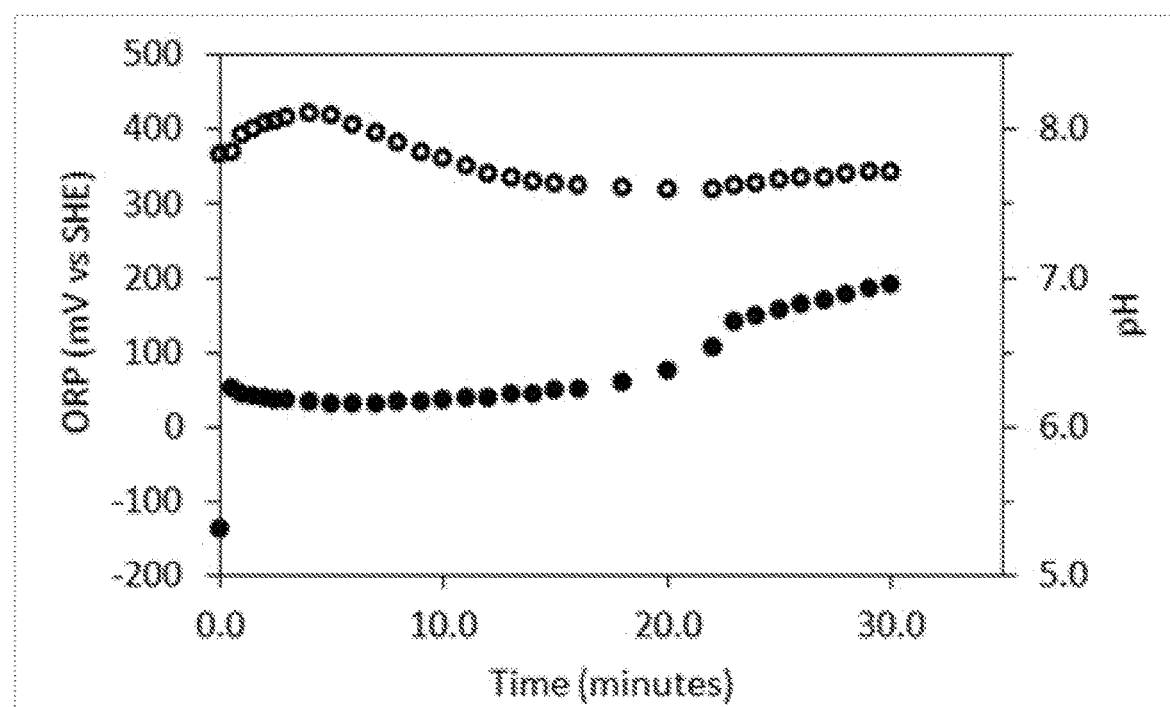
FIG. 3 depicts a graphical representation of a result of a method of treatment of $H_2S$ contaminated water with hydrogen peroxide.

A portion of the 80 mg/L $H_2S$ water was treated by mixing into it a 17% wt/wt solution of hydrogen peroxide such that the molar ratio of hydrogen peroxide to sulfide was about 5.7:1. Hydrogen peroxide was added in excess such that it was not a limiting reagent in the oxidation reaction. The ORP and pH of the water was monitored to track the oxidation rate of $H_2S$. FIG. 3 depicts the progression of ORP and pH over time during oxidation. Upon addition of hydrogen peroxide the ORP rapidly increased from about −140 mV (vs SHE) to 40 mV and the mixture slowly became cloudy with yellow suspended solids. After about 22 minutes the ORP increased more rapidly to greater than 100 mV indicating that the $H_2S$ had been fully oxidized. No detectable hydrogen sulfide was present in the mixture after oxidation. The suspended solids were slowly bleached to a milky white color over 20-25 minutes. The pH slightly increased during the initial stages of the oxidation suggesting that the $H_2S$ was rapidly oxidized leaving an excess of the more alkaline NaHS salt which oxidizes more slowly.

Figure 4:
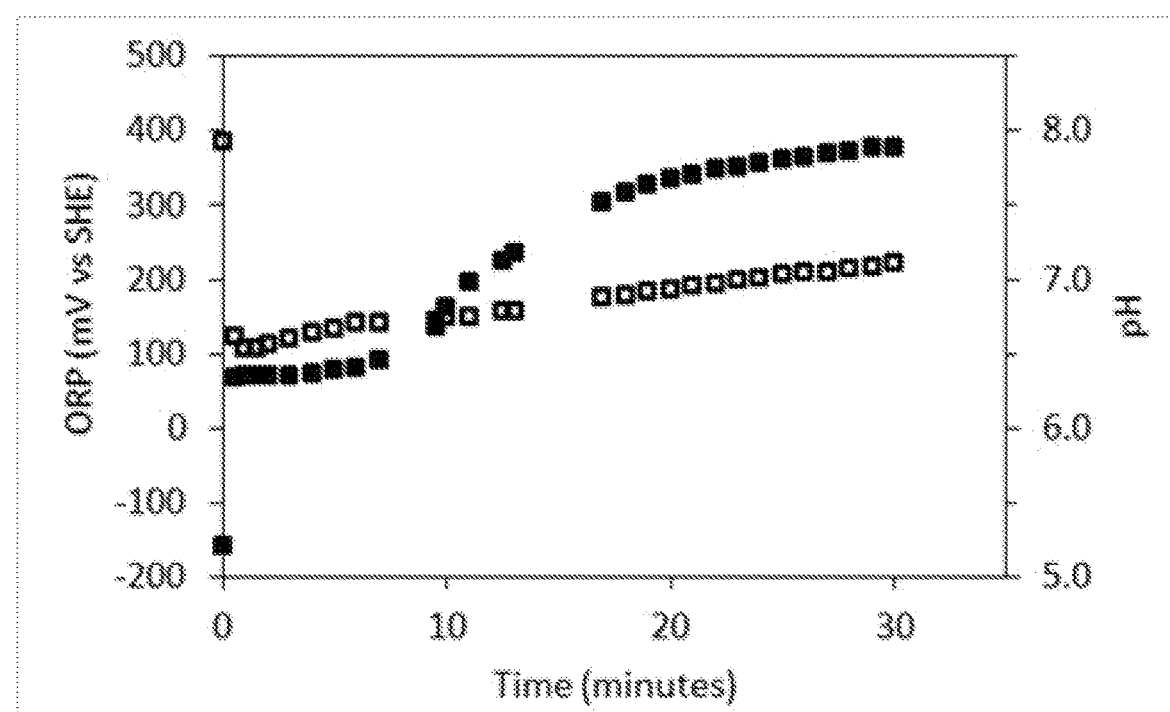
FIG. 4 depicts a graphical representation of a result of a method of treatment of $H_2S$ contaminated water with hydrogen peroxide in combination with an acid.

A second portion of the 80 mg/L $H_2S$ water was treated by mixing into it a 17% wt/wt solution of hydrogen peroxide such that the molar ratio of hydrogen peroxide to sulfide was about 5.7:1. A small portion of muriatic acid (about 34% hydrochloric acid solution) was added with the hydrogen peroxide to slightly lower the pH to between 6.5 and 7.0 thereby converting at least a portion of the NaHS to $H_2S$ and accelerate the reaction rate. FIG. 4 depicts the progression of ORP and pH over time during oxidation. Upon addition of hydrogen peroxide and muriatic acid the ORP rapidly increased from about −160 mV (vs SHE) to 70 mV and the mixture rapidly became cloudy with milky white suspended solids. After about 9 minutes the ORP increased more rapidly to greater than 100 mV indicating that the H$_2$S had been fully oxidized. No detectable hydrogen sulfide was present in the mixture after oxidation. The pH decreased rapidly from about pH 7.9 to 6.5 when the hydrogen peroxide and acid were added and then steadily increased over time. The rate of H$_2$S oxidation was approximately doubled when acid was added with the oxidant.

The increased rate of sulfide oxidation by hydrogen peroxide in combination with an acid allows for shorter contact times prior to a clarification step and a second oxidation or treatment step. The increased rate may allow, in some embodiments, a high H$_2$S water to be treated in a pipeline a short distance upstream of a water treatment facility so that high levels of H$_2$S are not brought onto a water treatment site. This H$_2$S oxidation process is fully contained and avoids the release and potential exposure of people and equipment to hazardous and corrosive levels of H$_2$S during subsequent water treatment processes including clarification, filtration and desalination. This may reduce costs of treatment, as well as increase safety, relative to treating the contaminated water in mix tanks at a treatment facility. Currently treatment is typically consolidated in a single facility, in this embodiment, at least some contaminants (e.g., sulfur based contaminants) are pretreated upstream before a treatment facility (e.g., using oxidants described herein).

A variety of acids having pKa values of less than 7 may be used in combination with hydrogen peroxide including inorganic acids or mineral acids (e.g., sulfuric acid, bisulfate, hydrochloric acid, phosphoric acid, nitric acid, carbonic acid) and organic acids (e.g., acetic acid, citric acid, propionic acid, tartaric acid, ascorbic acid). Using just a small quantity of acid is low cost and avoids the need to conduct a pH adjustment of the water aftertreatment.

Example: Rate of Hydrogen Sulfide Oxidation with Sodium Peracetate Oxidant Solution The oxidation of hydrogen sulfide is very rapid with the peracetate solution. A high H$_2$S water sample from a production well in western Texas was used to demonstrate the rapid rate of oxidation by the sodium peracetate formulation (described herein) by measuring hydrogen sulfide concentration immediately before and after treatment using the Hach method 10254 for sulfide.

The initial hydrogen sulfide concentration in the production water was 300 mg/L as sulfide and the water pH was 7.5. The water was gently stirred while sodium peracetate oxidant was added in a 2.5:1 molar ratio of oxidant to H$_2$S. Thirty seconds after the oxidant was added the hydrogen sulfide concentration was below detection, less than 5 mg/L. Yellow sulfur solids formed almost immediately and gradually turned very pale in color and partially settled over about 6-8 minutes.

Treatment for Hydrogen Sulfide and Other Sulfur-Containing Contaminants:

Hydrogen peroxide, while able to oxidize hydrogen sulfide and sulfites over several minutes near pH 7, does not provide complete oxidation of sulfur in organic sulfides and other sulfur-containing contaminants. Known examples of sulfur-containing contaminants that are only partially oxidized or not oxidized by hydrogen peroxide around pH 7 include, for example, mercaptans, disulfides, thiosulfate, tetrathionate, dialkyl sulfides and sulfoxides. In fact, hydrogen peroxide can potentially form several water soluble sulfur-containing compounds (e.g., various oxoacids and oxoacid salts of sulfur including sulfates, sulfites, thiosulfate, dithionate, disulfite polythionates, etc.) during H$_2$S oxidation without the ability to remove them or their oxidant demand. In some embodiments, by controlling the amount and/or rate of introduction of hydrogen peroxide the formation of undesirable products may be inhibited and/or controlled.

Gas stripping or gas scrubbing is a common method of removing H$_2$S from water, but has little impact on sulfur-containing contaminants with low volatility and does not remove microbes.

Incomplete oxidation of sulfides and sulfur-containing contaminants leaves a large oxidant demand in contaminated water, which can interfere with oxidative biocidal treatments or other chemistries. The sodium peracetate oxidant formulation (described herein) provides rapid oxidation of many sulfur-containing materials left untreated by hydrogen peroxide or gas stripping and also provides microbial control. For example, the sodium peracetate oxidant will rapidly oxidize thiosulfate to sulfate, which is an eight electron process or a 4:1 molar ratio of peracetate to thiosulfate.

Oxidizing H$_2$S and other sulfur-containing contaminants during water treatment for reuse in gel-based hydraulic fracturing fluids can reduce the amount of gel breaker consumed because common gel breakers are oxidants that can react with sulfides when activated such as sodium chlorite, sodium chlorate, or sodium persulfate. For example, gel breaker consumption in hydraulic fracturing fluid tests using peracetate oxidant-treated water could be reduced by a factor of 4 compared to water with H$_2$S removed but other sulfur-containing contaminants left untreated.

Example: Rapid Oxidation of Hydrogen Sulfide and Other Sulfur-Containing Contaminants Produced water from the Uintah basin in eastern Utah was tested for sulfide treatment and clarification with sodium peracetate solution. The untreated water appeared green-grey in color, was pH 8.1 and contained about 30 mg/L H$_2$S (as S$^2$), 90 mg/L organic or other sulfides (as S$^{2-}$), and 90 mg/L sulfate. Total iron was about 5 mg/L therefore iron sulfide was only a minor sulfide component. Additional water quality parameters are provided in Table II.

A first water sample was treated by a "partial oxidation" in Table II with sodium peracetate oxidant solution. The water was stirred in a closed container while sodium peracetate oxidant was added in a 1.25:1 molar ratio of oxidant to H$_2$S. Aluminum coagulant (about 35 mg/L as Al) was added with the oxidant. The mixture was stirred for 30 seconds and then about 5 mg/L of anionic polymer was added. Large floc formed rapidly over the next 60 seconds and then stirring was stopped. The flocculated solids settled rapidly leaving a clear, colorless supernatant. The "partial oxidation" treatment removed hydrogen sulfide and reduced acid producing bacteria (APB) and sulfate reducing bacteria (SRB) levels to 1-10 cells/mL for each. The ORP increased from −166 mV to 88 mV vs SHE (oxidant was fully consumed) and there was a 20 ppm increase in sulfate concentration due to oxidation of a small portion of sulfur-containing contaminants to sulfate. The "partial oxidation" treated water still had a significant oxidant demand and distinctive organic sulfide odor.

A second water sample was treated by a "full oxidation" in Table II with sodium peracetate oxidant solution. The water was stirred in a closed container while sodium peracetate oxidant was added in a 3.8:1 molar ratio of oxidant to $H_2S$. Aluminum coagulant (about 35 mg/L as Al) was added with the oxidant. The mixture was stirred for 30 seconds and then about 5 mg/L of anionic polymer was added. Large floc formed rapidly over the next 60 seconds and then stirring was stopped. The flocculated solids settled rapidly leaving a clear, colorless supernatant. The "full oxidation" treatment removed hydrogen sulfide and oxidized additional sulfide materials as indicated by the 3× greater oxidant consumption, an increase in the ORP to 300 mV (oxidant was fully consumed), nearly complete odor removal and an 80 ppm increase in sulfate concentration. The "full oxidation" treatment produced clarified water with low oxidant demand and no detectable grow back of APB or SRB after 4 months at room temperature.

TABLE II

| Parameter | Untreated Water | Treated Water Partial Oxidation | Treated Water Full Oxidation |
|---|---|---|---|
| pH | 8.1 | 7.7 | 7.4 |
| ORP (mV vs SHE) | −166 | 88 | 310 |
| $H_2S$ (mg/L L $S^{2-}$) | 30 | 0 | 0 |
| Iron, total (mg/L) | 5.4 | <0.01 | <0.01 |
| Calcium (mg/L $CaCO_3$) | 115 | 85 | 93 |
| Magnesium (mg/L $CaCO_3$) | 65 | 54 | 57 |
| Sulfate (mg/L) | 90 | 110 | 170 |
| TSS (mg/L) | 480 | 4 | 6 |
| APB (cells/mL) | 100-1000 | 1-10 | <1 |
| SRB (cells/mL) | 10-100 | 1-10 | <1 |

Example: Method of Treating a High $H_2S$ Water for Reuse

High $H_2S$ water has a high chemical demand and cost for treatment while processing high $H_2S$ water in conventional water treatment operations can pose serious health and safety hazards. This example describes a chemically efficient, effective and safe treatment process for high $H_2S$ water for reuse in the oilfield. For water containing more than 100 mg/L $H_2S$ treatment was found to be significantly more chemically efficient when multiple solids removal stages were used in the treatment process. In some embodiments, the treatment process incorporates automated control of oxidant dose rate to prevent excessive chemical use or under-treating the water. Automated control also provides a level of autonomous operation to reduce labor cost and reduce potential exposure of workers to hazardous materials or $H_2S$ emissions. In some embodiments, the treatment process design fully contains the water until hydrogen sulfide has been removed and its exposure hazard has been eliminated.

In this example hydrogen peroxide is used to oxidize the majority of $H_2S$ (typically 80-95%) during water transfer (e.g., from a water depot, storage facility or water collection pipeline network in a well field), which is an inexpensive oxidant that effectively reduces the hazard potential of $H_2S$ at a treatment facility. The use of sodium peracetate oxidant may rapidly oxidize the remaining $H_2S$, other sulfur-containing contaminants and controls bacteria in a compact treatment process footprint. In some embodiments, concentration ranges for hydrogen sulfide (appropriate for the two oxidant treatment approach described herein) are from about 20 ppm hydrogen sulfide and greater. Concentration ranges of hydrogen sulfide may range up to 1000 ppm hydrogen sulfide and greater.

In some embodiments, a portion of water may be treated until hydrogen sulfide is essentially removed, for example, about 50% to 100% of hydrogen sulfide is removed or about 80% to 99% of hydrogen sulfide is removed (percentage of removal is based upon the limitations of the detection method(s) used).

Figure 5:
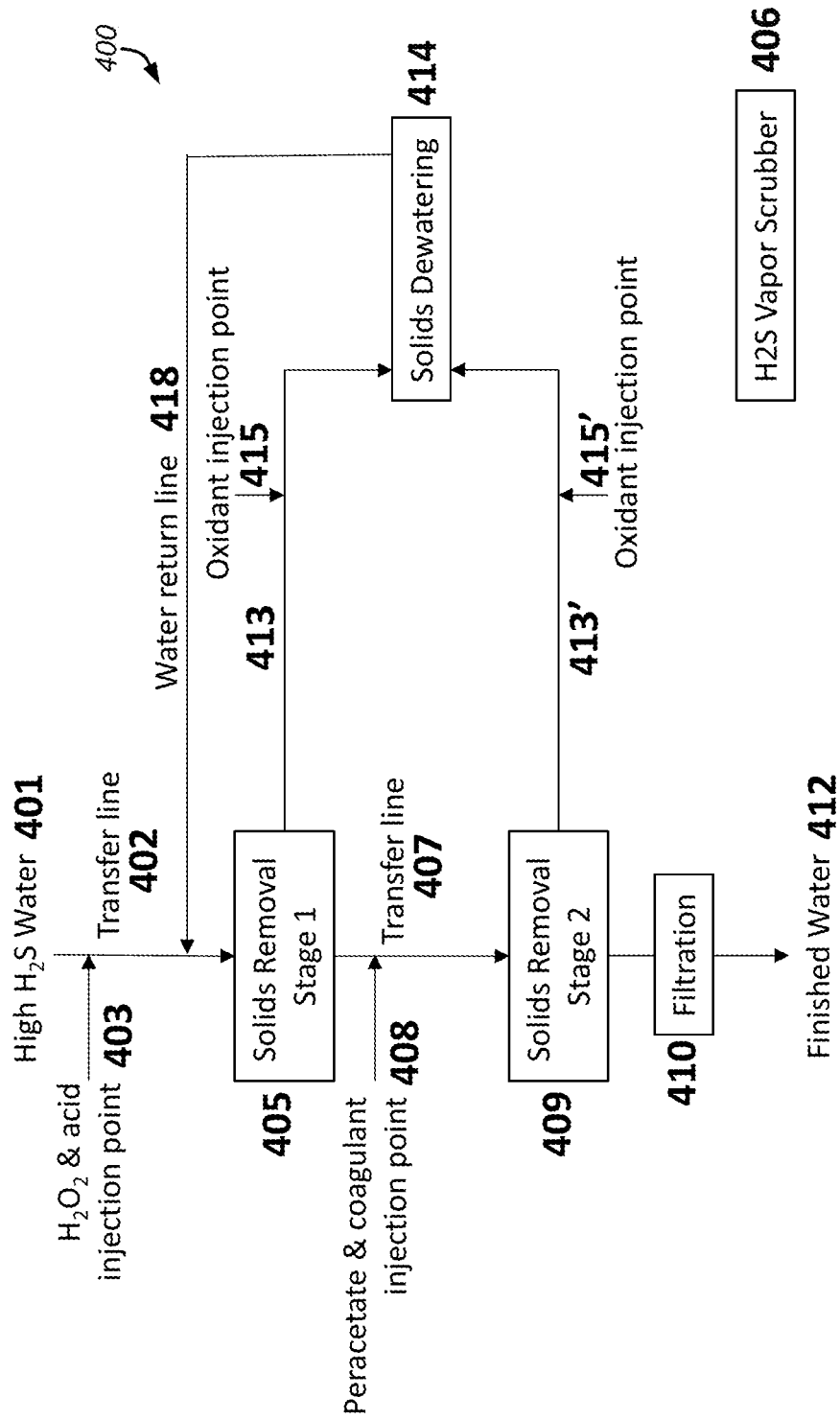
FIG. 5 depicts a graphical representation of a use of an embodiment of a treatment process for the rapid oxidation of $H_2S$, other sulfur-containing contaminants, and bacteria using a peracetate solution.

A general diagram of the treatment process 400 is provided in FIG. 5. A high $H_2S$ water 401 is conveyed through a transfer line 402 which has a hydrogen peroxide and acid injection point 403. The residence time of the high $H_2S$ water 401 combined with the hydrogen peroxide in transfer line 402 may be about 8 minutes or greater before reaching the solids removal stage 1 405. In some embodiments, in the solids removal stage 1 405 a coagulant and flocculation polymer may be used to accelerate solids separation. In some embodiments, solids separation may be conducted in a closed separator (e.g., covered weir tank, centrifuge) that is vented to a $H_2S$ vapor scrubber 406 to eliminate fugitive $H_2S$ emissions.

The water is transferred from the solids removal stage 1 405 through a transfer line 407 which may have a sodium peracetate oxidant and coagulant injection point 408. The residence time of the water combined with the sodium peracetate oxidant in transfer line 407 may be about 4 minutes or greater before reaching the solids removal stage 2 409. In the solids removal stage 2, 409 a flocculation polymer may be used to accelerate solids separation. Solids separation may be conducted in a closed separator (e.g., covered weir tank, centrifuge) that is vented to a $H_2S$ vapor scrubber 406 to eliminate fugitive $H_2S$ emissions. The clarified water from solids removal stage 2 409 is optionally passed through a filtration stage 410 to produce a finished water 412. Filtration stage 410 may incorporate sand filtration, activated carbon filtration, microfiltration, ultrafiltration, nanofiltration, reverse osmosis or a combination of filtration methods.

Solids collected in solids removal stage 1 405 and solids removal stage 2 409 are transferred as slurry through solids transfer lines 413 and 413' to a solids dewatering system 414. Any $H_2S$ carryover in the solids may be quenched by addition of an oxidant at oxidant injection points 415 and 415'. The solids dewatering system may be covered or contained and vented to a $H_2S$ vapor scrubber 406 to eliminate fugitive $H_2S$ emissions. The water removed from the solids may be transferred through water return line 418 into water transfer line 402 entering the solids removal stage 1 405.

In some embodiments, solids removal stage 1 405 is not incorporated in the treatment process. The sodium peracetate oxidant treatment is added to the water partially treated with hydrogen peroxide without removing the solids formed during the first oxidation stage.

In some embodiments, in the above high $H_2S$ water treatment system the dose rate of oxidants and finished water quality may be monitored and controlled by the use of sensors positioned throughout the process. In this process, water flow meters, temperature, ORP, pH and turbidity sensors may be incorporated in multiple locations. Chemical dose rate may be controlled automatically by water transfer flow meter feedback to the chemical injection system. ORP feedback to the chemical injection system further controls the dose rate of hydrogen peroxide and sodium peracetate oxidant automatically to ensure that the necessary level of treatment is being met continuously while not using excessive amounts of oxidants. This automation reduces or eliminates operator intervention in the water treatment process.

Monitoring pH and turbidity of the finished water provides feedback for meeting finished water quality specifications as required by a user.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for down-hole treatment of a production well for sulfur based contaminants, the method comprising:
   providing a peracetate solution comprising:
      peracetate anions;
      a peracid;
      a pH from about pH 10 to about pH 12; and
      a molar ratio of peracetate anions to peracid ranging from about 60:1 to about 6000:1;
   preparing outside of the well a treatment fluid, comprising combining the peracetate solution with a carrier fluid, wherein the treatment fluid comprises up to 1% by weight peracetate;
   placement of a volume of the treatment fluid in the well in contact with surfaces in a portion of the well for treatment for the sulfur based contaminants;
   after the placement, contacting the treatment fluid with the surfaces for a contact time while the well is off production; and
   following the contact time, commencing production from the well.

2. The method of claim 1, wherein the peracetate solution comprises a peracetate anion to hydrogen peroxide molar ratio of greater than about 16:1.

3. The method of claim 1, wherein the at least some sulfur based contaminants comprise iron sulfides, hydrogen sulfide, or iron sulfide deposits.

4. The method of claim 1, wherein:
   the portion of the well comprises a production zone and the surfaces comprise surfaces of the production zone and/or production equipment positioned in the production zone.

5. The method of claim 1, wherein the surfaces comprise surfaces of well casing.

6. The method of claim 1, wherein the placement comprises displacement of well fluids from the portion of the well with the treatment fluid.

7. The method of claim 1, wherein the carrier fluid comprises fresh water, salt water, or treated production water.

8. The method of claim 1, wherein the treatment fluid further comprises a treatment additive selected from the group consisting of hydrochloric acid, citric acid, acetic acid, acid-containing micellar solvent, corrosion inhibitor, and iron chelant.

9. The method of claim 1, wherein the well is a hydrocarbon production well, the method further comprising:
   acid treating the production well in a treatment sequence before or after treatment with the treatment fluid.

10. The method of claim 1, wherein the well is a hydrocarbon production well and the sulfur based contaminants comprise hydrogen sulfide from microbial activity, the method further comprising:
   antimicrobial treatment of the surfaces with the treatment fluid during the contact time.

11. The method of claim 1, wherein the well is a groundwater production well, the method further comprising:
   antimicrobial treatment of the surfaces with the treatment fluid during the contact time to reduce populations of iron and sulfate reducing bacteria.

12. The method of claim 1, further comprising killing hydrogen sulfide-producing bacteria in the portion of the well with the treatment fluid during the contact time.

13. The method of claim 1, further comprising degrading and/or removing biofilms in the portion of the well with the treatment fluid during the contact time.

14. The method of claim 1, wherein the placement comprises injecting the volume of the treatment fluid into the well and pushing the injected volume of the treatment fluid to the portion of the well with a second injection into the well of production water.

15. The method of claim 1, further comprising, after the commencing production, separating at least some sulfur based contaminants from produced well fluids, wherein at least some of the sulfur based contaminants comprise products resulting from the reaction of sulfur based contaminants with the treatment fluid.

16. The method of claim 1, wherein the portion of the well includes a production zone below a bottom end of a production tube in the well, and the method further comprising:
   after the commencement of production, introducing a second volume of the treatment fluid into an annulus in the well between the production tube and well casing and circulating the second volume of the treatment fluid down the annulus and up through the production tube to treat the production tube while the well is on production.

17. The method of claim 16, wherein the second volume of the treatment solution is freshly prepared during the contact time.

18. The method of claim 1, wherein the peracetate comprises sodium peracetate.

* * * * *